United States Patent
Visco et al.

(10) Patent No.: US 8,932,771 B2
(45) Date of Patent: Jan. 13, 2015

(54) CATHODE ARCHITECTURES FOR ALKALI METAL / OXYGEN BATTERIES

(75) Inventors: Steven J. Visco, Berkeley, CA (US); Vitaliy Nimon, San Francisco, CA (US); Lutgard C. De Jonghe, Lafayette, CA (US); Yury Volfkovich, Moscow (RU); Daniil Bograchev, Moscow (RU)

(73) Assignee: PolyPlus Battery Company, Berkeley, CA (US)

( * ) Notice: Subject to any disclaimer, the term of this patent is extended or adjusted under 35 U.S.C. 154(b) by 155 days.

(21) Appl. No.: 13/525,128

(22) Filed: Jun. 15, 2012

(65) Prior Publication Data

US 2013/0295471 A1 Nov. 7, 2013

Related U.S. Application Data

(60) Provisional application No. 61/642,427, filed on May 3, 2012, provisional application No. 61/655,363, filed on Jun. 4, 2012.

(51) Int. Cl.
*H01M 4/46* (2006.01)
*H01M 4/48* (2010.01)
*H01M 10/04* (2006.01)

(52) U.S. Cl.
USPC ........... 429/404; 429/405; 429/407; 29/623.1

(58) Field of Classification Search
USPC .............. 429/402, 403, 404, 405, 188, 231.1, 429/246, 535, 118, 119, 210, 407
See application file for complete search history.

(56) References Cited

U.S. PATENT DOCUMENTS

| | | | |
|---|---|---|---|
| 3,528,856 A | 9/1970 | Ovshinsky |
| 3,607,417 A | 9/1971 | McRae et al. |
| 3,615,835 A | 10/1971 | Ovshinsky |
| 3,625,769 A | 12/1971 | Lyall |
| 3,703,415 A | 11/1972 | Mitoff et al. |
| 3,783,026 A | 1/1974 | Kordesch |
| 3,912,536 A | 10/1975 | Galli et al. |
| 3,976,509 A | 8/1976 | Tsai et al. |

(Continued)

FOREIGN PATENT DOCUMENTS

| EP | 0111214 | 11/1983 |
|---|---|---|
| EP | 0694501 | 1/1996 |

(Continued)

OTHER PUBLICATIONS

De Jonghe et al., "Status of the development of Li-air batteries", Topsoe Catalyst Forum, Aug. 25-26, 2011. P1-43.*

(Continued)

*Primary Examiner* — Kenneth Douyette
(74) *Attorney, Agent, or Firm* — Weaver Austin Villeneuve & Sampson LLP

(57) ABSTRACT

Electrochemical energy storage devices, such as alkali metal-oxygen battery cells (e.g., non-aqueous lithium-air cells), have a cathode architecture with a porous structure and pore composition that is tailored to improve cell performance, especially as it pertains to one or more of the discharge/charge rate, cycle life, and delivered ampere-hour capacity. A porous cathode architecture having a pore volume that is derived from pores of varying radii wherein the pore size distribution is tailored as a function of the architecture thickness is one way to achieve one or more of the aforementioned cell performance improvements.

18 Claims, 6 Drawing Sheets

(56) References Cited

U.S. PATENT DOCUMENTS

| | | |
|---|---|---|
| 4,007,057 A | 2/1977 | Littauer et al. |
| 4,091,182 A | 5/1978 | Farrington et al. |
| 4,162,202 A | 7/1979 | Dey |
| 4,163,084 A | 7/1979 | Tsai et al. |
| 4,210,707 A | 7/1980 | Farrington |
| 4,402,995 A | 9/1983 | Fleischer |
| 4,405,416 A | 9/1983 | Raistrick et al. |
| 4,414,293 A | 11/1983 | Joy et al. |
| 4,504,561 A | 3/1985 | Winsel |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | de Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | DeJonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 6,017,651 A | 1/2000 | Nimon et al. |
| 6,025,094 A | 2/2000 | Visco et al. |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,210,832 B1 | 4/2001 | Chu et al. |
| 6,214,061 B1 | 4/2001 | Visco et al. |
| 6,224,744 B1 | 5/2001 | Casado Gimenez et al. |
| 6,225,002 B1 | 5/2001 | Chu et al. |
| 6,228,527 B1 | 5/2001 | Medeiros et al. |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,829,212 B2 | 11/2010 | Visco et al. |
| 8,048,571 B2 | 11/2011 | Visco et al. |
| 8,182,943 B2 | 5/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,455,131 B2 | 6/2013 | Visco et al. |
| 8,658,304 B2 | 2/2014 | Visco et al. |
| 8,673,477 B2 | 3/2014 | Visco et al. |
| 2001/0014420 A1 | 8/2001 | Takeuchi et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim et al. |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0100792 A1 | 5/2005 | Visco et al. |
| 2005/0100793 A1 | 5/2005 | Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0037058 A1 | 2/2007 | Visco et al. |
| 2007/0051620 A1 | 3/2007 | Visco et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0172739 A1 | 7/2007 | Visco et al. |
| 2007/0231704 A1 | 10/2007 | Inda |

(56) References Cited

U.S. PATENT DOCUMENTS

| | | | |
|---|---|---|---|
| 2007/0259234 | A1 | 11/2007 | Chua et al. |
| 2009/0239152 | A1 | 9/2009 | Katoh |
| 2009/0311567 | A1 | 12/2009 | Visco et al. |
| 2009/0311596 | A1 | 12/2009 | Visco et al. |
| 2009/0311603 | A1 | 12/2009 | Visco et al. |
| 2009/0311605 | A1 | 12/2009 | Visco et al. |
| 2011/0014522 | A1 | 1/2011 | Visco et al. |
| 2011/0059355 | A1* | 3/2011 | Zhang et al. ............ 429/188 |
| 2011/0269007 | A1 | 11/2011 | Visco et al. |
| 2012/0009469 | A1 | 1/2012 | Visco et al. |
| 2012/0015228 | A1 | 1/2012 | Yoon et al. |
| 2013/0045428 | A1 | 2/2013 | Visco et al. |
| 2013/0122380 | A1 | 5/2013 | Visco et al. |
| 2014/0050994 | A1 | 2/2014 | Visco et al. |
| 2014/0057153 | A1 | 2/2014 | Visco et al. |

FOREIGN PATENT DOCUMENTS

| | | |
|---|---|---|
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-103271 | 6/1982 |
| JP | 57-172660 | 10/1982 |
| JP | 62-243247 | 10/1987 |
| JP | 04-275387 | 9/1992 |
| JP | 05-234578 | 9/1993 |
| JP | 09-320645 | 12/1997 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10-2001-0024927 | 3/2001 |
| WO | 98/28811 | 7/1998 |
| WO | 99/57770 | 11/1999 |
| WO | 02/50933 | 6/2002 |
| WO | 2005/038953 | 4/2005 |
| WO | 2005/038962 | 4/2005 |
| WO | 2005/083829 | 9/2005 |
| WO | 2007/021717 | 2/2007 |

OTHER PUBLICATIONS

International Search Report and Written Opinion dated Oct. 18, 2005 from International Application No. PCT/US2004/033372.
De Jonghe et al., "Chemical Protection of a Lithium Surface", PolyPlus Battery Company, U.S. Appl. No. 11/092,781, filed Mar. 28, 2005, pp. 1-34.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 10/986,441, Office Action mailed Oct. 20, 2008.
U.S. Appl. No. 11/823,847, "Ionically conductive composites for protection of active metal anodes", Visco et al., filed Jun. 27, 2007.
U.S. Appl. No. 11/823,847, Office Action mailed Sep. 16, 2008.
U.S. Appl. No. 11/823,847, Office Action mailed Apr. 28, 2009.
U.S. Appl. No. 12/649,245, "Active metal / aqueous electrochemical cells and systems", Visco et al., filed Dec. 29, 2009.
U.S. Appl. No. 12/649,245, Office Action mailed Mar. 31, 2010.
U.S. Appl. No. 11/824,574, "Ionically conductive membranes for protection of active metal andoes and battery cells", Visco et al., filed Jun. 29, 2007.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O—Al2O3—TiO2-SiO2-P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+x}M_xTi_{2-x}(PO_4)_3$, M = Al, Sc, Y, and La) Systems", Dept. of Industrial Chemistry, pp. 590-591.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of β-$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$-$P_2O_5$", Solid State Ionics, 96 (1997), pp. 195-200.
Fu, Jie, "Fast Li+ ion conducting glass-ceramics in the system $Li_2O$—$Al_2O_3$—$GeO_2$—$P_2O_5$" Solid State Ionics 104 (1997), pp. 191-194.
Aono, et al., "DC Conductivity of $Li_{1.3}Al_{0.3}Ti_{1.7}(PO_4)_3$ Ceramic with Li Electrodes", Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3$, $M^{3+}$=$Al^{3+}$, $Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.

(56) References Cited

OTHER PUBLICATIONS

Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, 4th vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
U.S. Appl. No. 11/824,574, Office Action mailed Dec. 31, 2008. (PLUSP039C1).
CN patent application No. 200480042697.3, Office Action mailed Dec. 19, 2008.
Thokchom, Joykumar S., et al., Water Durable Lithium Ion Conducting Composite Membranes from the $Li_2O$—$Al_2O_3$—$TiO_2$—$P_2O_5$ Glass-Ceramic, Journal of the Electrochemical Society, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42nd Power Sources Conference, Jun. 2006, P2.14.
Read J., "Electrolyte Formulation and Temperature Performance of the $Li/O_2$ Battery", Proceeding of the 9th Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 11, 2009.
U.S. Appl. No. 11/245,472, Office Action mailed Feb. 4, 2010.
U.S. Appl. No. 12/475,403, Office Action mailed Feb. 8, 2010.
International patent application No. PCT/US2009/047278, International Search Report and Written Opinion dated Jan. 21, 2010.
AU patent application No. 2003301383, Notice of Acceptance mailed Nov. 26, 2009.
Visco, S.J. et al., "Lithium-Air", Encyclopedia of Electrochemical Power Sources, Dyer (editor), Elsevier, 2009, ISBN: 9780444527455, pp. 376-383.
U.S. Appl. No. 10/824,944, Notice of Allowance mailed Jul. 31, 2007.
U.S. Appl. No. 10/772,157, Notice of Allowance mailed Sep. 17, 2009.
U.S. Appl. No. 11/824,548, Notice of Allowance mailed Dec. 17, 2009.
U.S. Appl. No. 12/649,245, Office Action mailed Jul. 19, 2010.
U.S. Appl. No. 12/649,245, Office Action mailed Nov. 30, 2010.
U.S. Appl. No. 12/649,245, Office Action mailed May 2, 2011.
U.S. Appl. No. 12/649,245, Notice of Allowance mailed Sep. 14, 2011.
U.S. Appl. No. 11/824,597, Notice of Allowance mailed Sep. 9, 2010.
U.S. Appl. No. 11/612,741, Office Action mailed Nov. 29, 2010.
U.S. Appl. No. 11/612,741, Office Action mailed Jul. 22, 2011.
U.S. Appl. No. 11/612,741, Notice of Allowance mailed Feb. 3, 2012.
AU patent application No. 2004306866, Notice of Acceptance mailed Jun. 17, 2010.
CA patent application No. 2,542,304, Examination Report mailed Apr. 4, 2011.
CN patent application No. 200480037293.5, Office Action mailed Jan. 29, 2010.
CN patent application No. 200480037293.5, Office Action mailed Jun. 24, 2010.
JP patent application No. 2006-535572, Office Action mailed Jun. 21, 2011.

(56) References Cited

OTHER PUBLICATIONS

KR patent application No. 2006-7007309, Office Action mailed Jul. 27, 2011.
CA patent application No. 2,555,637, Exam Report mailed May 10, 2011.
CN patent application No. 200910174918.7, Office Action mailed Oct. 19, 2011.
EP patent application No. 04794655.3, Examination Report mailed Apr. 22, 2010.
JP patent application No. 2006-552102, Office Action mailed Jul. 5, 2011.
KR patent application No. 10-2006-7017692, Notice to Submit Response mailed May 13, 2011.
U.S. Appl. No. 12/484,063, Office Action mailed Feb. 6, 2012.
KR patent application No. 9-5-2012-016417008, Office Action mailed Mar. 21, 2012.
CA patent application No. 2,542,304, Exam Report mailed Apr. 3, 2012.
U.S. Appl. No. 12/484,079, Office Action mailed Apr. 27, 2012.
U.S. Appl. No. 13/236,428, Notice of Allowance mailed Apr. 25, 2012.
U.S. Appl. No. 12/888,154, Office Action mailed May 3, 2012.
U.S. Appl. No. 12/484,081, Office Action mailed Jun. 21, 2012.
U.S. Appl. No. 12/484,063, Office Action mailed Aug. 1, 2012.
U.S. Appl. No. 12/484,065, Office Action mailed Aug. 9, 2012.
U.S. Appl. No. 13/453,964, Notice of Allowance mailed Aug. 14, 2012.
U.S. Appl. No. 12/484,063, Notice of Allowance mailed Sep. 14, 2012.
U.S. Appl. No. 13/464,835, "Protected lithium electrodes having tape cast ceramic and glass-ceramic membranes," Visco et al., filed May 4, 2012.
U.S. Appl. No. 12/888,154, Notice of Allowance mailed Aug. 20, 2012.
U.S. Appl. No. 13/464,835, Office Action mailed Sep. 25, 2012.
JP patent application No. 2006-552102, Office Action mailed Sep. 25, 2012.
KR patent application No. 9-5-2012-016417008, Notice of Allowance mailed Nov. 23, 2012.
U.S. Appl. No. 12/484,081, Notice of Allowance mailed Jan. 18, 2013.
U.S. Appl. No. 12/484,065, Office Action mailed Feb. 19, 2013.
CA patent application No. 2,542,304, Office Action mailed Jan. 30, 2013.
JP patent application No. 2006-535572, Decision to Grant a Patent mailed Sep. 4, 2012.
CA patent application No. 2,555,637, Notice of Allowance mailed Apr. 17, 2012.
CN patent application No. 200980131906.4, First Office Action mailed Dec. 4, 2012.
MX patent application No. 2010/013888, First Official Action mailed Jan. 25, 2013.
U.S. Appl. No. 12/484,079, Office Action mailed Nov. 29, 2012.
U.S. Appl. No. 12/973,779, Office Action mailed Dec. 19, 2012.
WO patent application No. PCT/US2011/030969, International Search Report and Written Opinion mailed Jan. 11, 2012.
U.S. Appl. No. 12/484,079, Notice of Allowance mailed Apr. 17, 2013.
U.S. Appl. No. 13/464,835, Office Action mailed May 2, 2013.
U.S. Appl. No. 12/973,779, Office Action mailed May 31, 2013.
U.S. Appl. No. 12/484,065, Office Action mailed Jun. 17, 2013.
EP patent application No. 09794889, Supplemental Search Report mailed May 21, 2013.
U.S. Appl. No. 13/673,789, Notice of Allowance mailed Oct. 1, 2013.
U.S. Appl. No. 12/484,065, Notice of Allowance mailed Oct. 4, 2013.
MX patent application No. 2010/013888, Office Action mailed Jul. 22, 2013.
CN patent application No. 200980131906.4, Office Action mailed Jun. 26, 2013.
JP patent application No. 2011-513742, Office Action mailed Oct. 8, 2013.
JP patent application No. 2006-552102, Office Action mailed Nov. 26, 2013.
JP patent application No. 2011-513742, Notification of Reasons for Rejection mailed Feb. 4, 2014.
Nimon, Vitaliy Y. et al., Modeling and Experimental Study of Porous Carbon Cathodes in Li—$O_2$ Cells with Non-Aqueous Electrolyte, ECS Electrochemistry Letters, 2 (4) A33-A35, Jan. 28, 2013.
WO patent application No. PCT/US2012/051485, International Search Report and Written Opinion mailed Mar. 4, 2013.
Visco, Steven J. et al., "Aqueous and nonaqueous lithium-air batteries enabled by water-stable lithium metal electrodes," Solid State Electrochem (2014) 18:1443-1456.

* cited by examiner

US 8,932,771 B2

CATHODE ARCHITECTURES FOR ALKALI METAL / OXYGEN BATTERIES

CROSS-REFERENCE TO RELATED APPLICATIONS

This application claims priority to U.S. Provisional Patent Application No. 61/642,427 filed May 3, 2012, titled CATHODE ARCHITECTURES FOR ALKALI METAL OXYGEN BATTERIES; and U.S. Provisional Patent Application No. 61/655,363 filed Jun. 4, 2012, titled CATHODE ARCHITECTURES FOR ALKALI METAL OXYGEN BATTERIES. Each of these prior applications is incorporated herein by reference in its entirety and for all purposes.

STATEMENT OF GOVERNMENT SUPPORT

This invention was made with Government support under Award No.: DE-AR0000061 awarded by the Advanced Research Projects Agency-Energy (ARPA-E), U.S. Department of Energy. The Government has certain rights in this invention.

FIELD OF THE INVENTION

The present invention relates to alkali metal-oxygen batteries, and, in particular, to lithium-air cells, and methods of making such cells.

BACKGROUND OF THE INVENTION

The large free energy for the reaction of lithium with oxygen has attracted the interest of battery researchers for decades. At a nominal potential of about 3 Volts, the theoretical specific energy for a lithium-air battery is between 5000 and 11,000 Wh/kg depending on the nature of the electrolyte and the end of discharge reaction product. Today, it is generally recognized that there are two main configurations of lithium-air battery technology, depending on whether an aqueous or non-aqueous electrolyte is employed in contact with the cathode, i.e., catholyte.

In aqueous lithium-air cells, gas diffusion electrodes (GDEs), similar to those used in zinc-air batteries, are commonly employed as the air cathode. The GDE, composed of both hydrophobic and hydrophilic surfaces, contains a mixture of interconnected pores, some filled with air or other molecular oxygen-containing gas to facilitate oxygen diffusion, and others filled with the aqueous electrolyte. The cell reaction involves water and the reaction product includes lithium hydroxide, which dissolves in water:

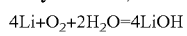

$$4Li+O_2+2H_2O=4LiOH$$

The cell chemistry of non-aqueous lithium-air technology is very different from that of aqueous lithium-air technology:

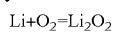

$$Li+O_2=Li_2O_2$$

In non-aqueous lithium-air cells, lithium ions and oxygen molecules have to move through the non-aqueous electrolyte. Discharge products mainly consist of $Li_2O_2$ that precipitates on the cathode. Moreover, in contradistinction to the GDE used in aqueous lithium-air cells, non-aqueous lithium-air cathodes employ what is sometimes referred to as a flooded electrode configuration wherein the cathode pores, having surfaces that are readily wetted by non-aqueous organic solvents, are entirely filled (i.e., are flooded) by the electrolyte.

SUMMARY OF THE INVENTION

It has been noted that flooded electrodes have at least two major disadvantages: i) the ampere-hour capacity density and cycle life are limited as copious amounts of solid product accumulate in electrolyte filled pores on discharge, blocking ion conduction as well as oxygen diffusion, and ultimately leading to cell polarization; and ii) the power density (Watts/kg and Watts/liter) is hindered as oxygen permeation within the cathode is limited by the diffusion rate and concentration of dissolved molecular oxygen in the liquid electrolyte. Therefore, there is a need for an improved air cathode for use in lithium-air battery cells that is not limited by long diffusion paths of oxygen through the liquid electrolyte and is capable of storing large amounts of solid discharge product without prematurely polarizing the cell.

This invention provides alkali metal oxygen battery cells having high specific energy. The cells include an alkali metal anode (e.g., a lithium electrode) and a porous cathode architecture that provides: i) active electron transfer surfaces (sometimes referred to as active surfaces) on which the cathode electrochemical reactions take place; ii) liquid electrolyte (i.e., catholyte) filled pores that serve as conductive pathways for lithium ion transport within the cathode architecture; iii) gas filled through pores that provide channels for fast diffusion of molecular oxygen into and within the depth of the cathode architecture; and iv) storage pores wherein discharge products are preferentially driven to accumulate, and may ultimately precipitate as a solid phase product, such as $Li_2O_2$ and, possibly, $Li_2O$ (for non-aqueous Li-oxygen cell embodiments), and LiOH or $LiOH.H_2O$ (for example, in embodiments of aqueous Li-oxygen cells).

In accordance with the instant invention, the cathode architecture can be enhanced or optimized to improve one or more of the following cell performance parameters: discharge and/or charge rate (as measured in $mA/cm^2$), cycle life, and delivered capacity density (as measured in Ah/cc or Ah/kg). Specifically, the porous cathode architecture is imbibed, in whole or in part, with a liquid electrolyte (i.e., catholyte), and the architecture porous structure, defined by its pore size distribution and constituent pore composition, is tailored in combination with the type and amount of liquid electrolyte employed in the architecture to effect one or more of the aforementioned performance improvements.

In various embodiments, cells in accordance with the present invention are lithium-air cells having an open cell construction, which means that the interior components of the cell, and in particular the cathode architecture, are open to the environment in which the cell operates and from which molecular oxygen is harnessed as the cathode active species. The invention is, however, not limited to open cell constructions, and closed cell constructions are also contemplated in which molecular oxygen is harnessed from an external source of oxygen, such as an oxygen or air containing storage tank adapted to the cell for gas flow communication (e.g., via plumbing lines such as plastic tubing or metal piping and optional valving).

In one aspect, the invention provides an alkali metal/oxygen battery cell having an alkali metal anode with a major active surface and a partially dry cathode architecture adjacent the alkali metal anode major surface. The partially dry architecture has at least two porous regions each having a different porous structure, and also contains a certain volume of liquid electrolyte incorporated in the architecture. The first porous region serves as an electron transfer medium, providing active surface sites for electron transfer as well as access for molecular oxygen to enter the cathode architecture. The second porous region is disposed nearby (e.g., adjacent to and typically in direct contact with) the anode major surface. Moreover, the second porous region is not an electron transfer region, by which it is meant that this region is not intended to provide surface sites on which electron transfer reactions take place. Preferably, no electron transfer reactions take place in the second porous region. However, it is contemplated that in some embodiments, when the second porous region includes an electronic conductor, that over the course of cell discharge, and or charge, unintended electron transfer reactions may occur, but such unintended electron transfer is typically less than 5% of the total electron transfer (based on the cell's full discharge capacity), and preferably less than 2%, more preferably less than 1% and most preferably no electron transfer takes place in the second porous region. Furthermore, the first and second porous regions are typically in pore communication, that is, their respective pores are fluidly contiguous whereby said fluid may be a liquid or gas or combination thereof. Further, the first and second porous regions are each characterized as having a certain total pore volume (i.e., the first region having a first region total pore volume and the second region having a second region total pore volume), and the certain volume of liquid electrolyte disposed within the architecture is greater than the total pore volume of the second region but less than the cumulative total pore volumes of the first and second regions. It is to be understood that the certain volume of liquid electrolyte disposed within the architecture correlates to the total amount of liquid electrolyte dispensed into the cell on the cathode side and which is present on the cathode side of the cell immediately prior to initial cell operation, and typically said amount is the amount present in the cell upon cell fabrication. In some embodiments, the liquid electrolyte in the architecture is non-aqueous. However the invention is not limited to non-aqueous liquid electrolytes employed in the cathode architecture, but is meant to include aqueous electrolyte and combinations thereof, such as an electrolyte composed of at least one non-aqueous solvent (typically a liquid, e.g., an organic or ionic liquid) and water in an amount beyond that considered an impurity; for instance an amount of water beyond 100 parts per million relative to the liquid electrolyte. In embodiments the difference between the first and second porous regions is at least one of composition, pore size distribution and solid material from which the porous region is composed.

In another aspect, the invention provides a method of making a metal oxygen battery cell. In various embodiments the method includes providing an alkali metal anode having a major active surface and a porous cathode architecture having a first and second porous region. The first porous region serves as an electron transfer region, defines a first region total pore volume, and includes liquid electrolyte filled pores having surfaces on which oxygen molecules are electro-reduced during cell discharge. The second porous region is not an electron transfer region, but defines a second region total pore volume. The method further includes the steps of configuring the anode major active surface adjacent the cathode architecture, and, in particular, opposing the architecture's second porous region, and filling the cathode architecture with a volume of liquid electrolyte that is greater than the second region total pore volume but less than the combined total pore volume of the first and second regions. Moreover, the volume of liquid electrolyte in the cathode architecture is the amount present immediately prior to and upon initial cell operation and generally is the amount present upon cell fabrication, by which is meant the total amount dispensed into the cell during manufacture.

DETAILED DESCRIPTION OF SPECIFIC EMBODIMENTS

Figure 1:
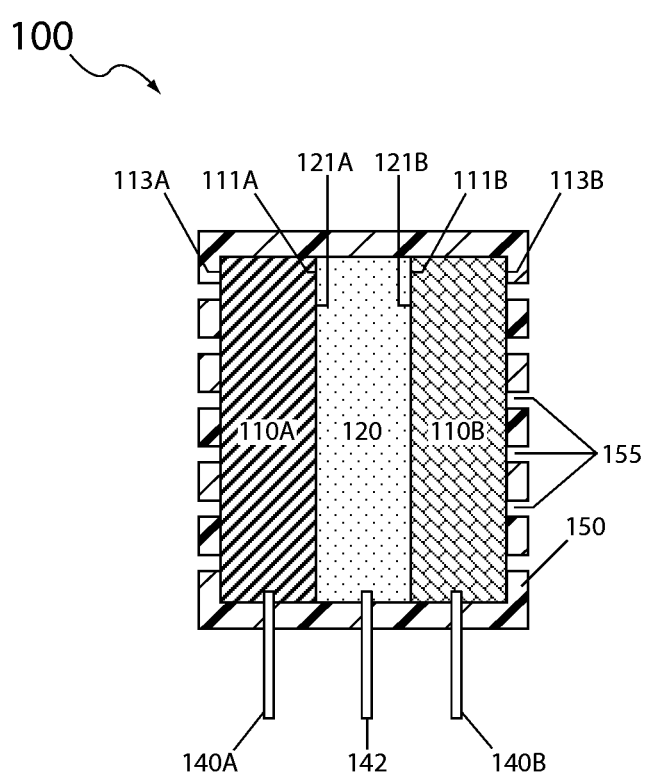
FIG. 1 is a schematic cross section of a battery cell in accordance with various embodiments of the instant invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in detail so as to not unnecessarily obscure the present invention.

Introduction

This invention provides alkali metal oxygen battery cells having high specific energy. The cells include an alkali metal anode (e.g., a lithium electrode) and a porous cathode architecture that provides: i) electron transfer surfaces (sometimes referred to as active surfaces) on which the cathode electrochemical reactions take place; ii) liquid electrolyte filled pores that serve as conductive pathways for lithium ion transport within the cathode architecture; iii) gas filled through pores that provide channels for fast diffusion of molecular oxygen into and within the depth of the cathode architecture; and iv) storage pores wherein discharge products are preferentially driven to accumulate, and may ultimately precipitate as a solid phase product, such as $Li_2O_2$ and, possibly, $Li_2O$ (for non-aqueous Li-oxygen cell embodiments), and LiOH or $LiOH.H_2O$ (for embodiments of aqueous Li-oxygen cells).

In accordance with the instant invention, the cathode architecture is enhanced or optimized to improve one or more of the following cell performance parameters: discharge and/or charge rate (as measured in $mA/cm^2$), cycle life, and delivered capacity density (as measured in Ah/cc or Ah/kg). Specifically, the porous cathode architecture is imbibed, in whole or in part, with a liquid electrolyte, and the architecture porous structure, defined by its pore size distribution and constituent pore composition, is tailored in combination with the type and amount of liquid electrolyte employed in the architecture to effect one or more of the aforementioned performance improvements.

In various embodiments the instant cells are lithium-air cells having an open cell construction, which means that the interior components of the cell, and in particular the cathode architecture, are open to the environment in which the cell operates and from which molecular oxygen is harnessed as the cathode active species. The invention is, however, not limited to open cell constructions, and closed cell constructions are also contemplated in which molecular oxygen is harnessed from an external source of oxygen, such as an oxygen or air containing storage tank adapted to the cell for gas flow communication (e.g., via plumbing lines such as plastic tubing or metal piping and optional valving).

A lithium-oxygen battery cell in accordance with various lithium-air cell embodiments of the instant invention is schematically illustrated in FIG. 1. The cell 100 includes a case or housing 150; a pair of porous cathode architectures 110A/110B, each having first and second major and opposing surfaces (111A/B and 113A/B respectively); and an anode 120 having a first and second major surface 121A/121B adjacent to and typically in direct contact with the first major surfaces of the architectures to which it is positionally opposed. The cell 100 has an open construction. To provide access to the ambient air or molecular oxygen-containing gas which serves as the source of molecular oxygen for electrochemical reaction in the cell, each second major surface 113A/113B is positioned in the cell adjacent to or nearby the molecular oxygen-permeable outer casing wall 155.

In various embodiments, the first and second porous architectures 110A and 110B are similar, and typically substantially identical, but the invention is not limited as such, and it is contemplated herein that architectures 110A and 110B may be different from each other; for example, in terms of porous structure, pore composition, or macroscopic geometry (e.g., of different thickness).

Figure 2:
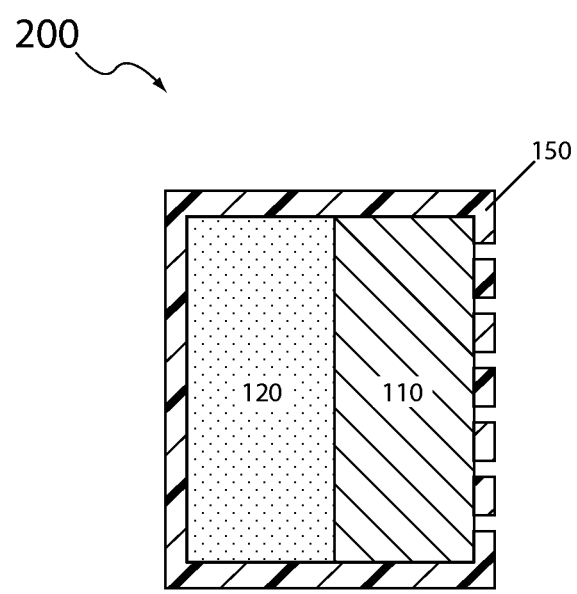
FIG. 2 is a schematic cross section of a battery cell in accordance with various embodiments of the instant invention.

In alternate open construction cell embodiments, the lithium-air cell is single sided, as illustrated in FIG. 2. In embodiments thereof, cell 200 is similar to cell 100 except the anode second surface (the surface opposite the anode/cathode architecture interface) opposes a solid casing sidewall, impermeable to molecular oxygen, and, as the name 'single sided' implies, a single cathode architecture is employed rather than a pair of similar or different architectures.

Figure 3:
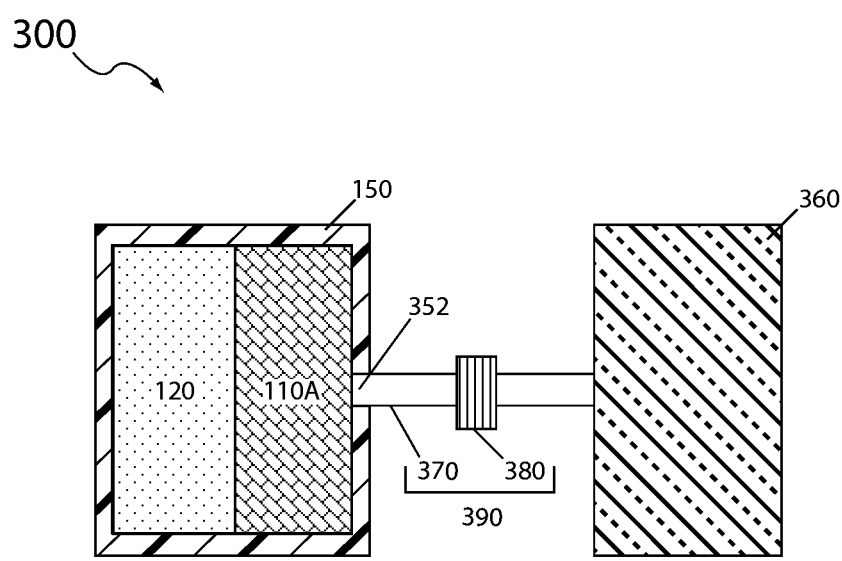
FIG. 3 is a schematic cross section of a battery cell in accordance with various embodiments of the instant invention.

In yet other embodiments, a closed cell construction may be used. As illustrated in FIG. 3, a non-aqueous lithium-oxygen cell 300 is configured to harness oxygen from a source that is not ambient air, such as a storage tank 360 containing molecular oxygen (in the gaseous, liquid or solid phase). The tank is adapted to interface with the architecture 110A via pipeworks 390 including liquid or gaseous flow through tubing 370 and valves 380; for example, polyethylene tubing disposed through a port hole 352 in the casing side wall 150 adjacent the architecture.

Referring again to FIG. 1, in various of the aforementioned embodiments, the cell further includes cathode (positive) terminals 140A/B and anode (negative) terminals 142 adapted for electronic communication to the cathode architecture(s) and anode respectively. For example, the cathode terminal can be a nickel tab in direct contact with an electronically conductive portion of the architecture (e.g., as described in more detail below a nickel mesh current collector), and the anode terminal a copper tab in contact with (e.g., welded to) a copper current collector in direct contact with the electroactive lithium material (e.g., lithium metal foil or a coating of carbon intercalation material), or a copper tab in direct contact with the lithium metal (e.g., crimp connected).

The cathode architecture 110A/B (or more simply architecture) is a porous body having interconnected pores, the total volume of which is sometimes referred to herein as the architecture's "total pore volume" or "cumulative pore volume." The porous architecture serves a number of purposes, including one or more of: i) providing active surfaces on which the electrochemical reactions in the cathode take place (i.e., electron transfer surfaces); ii) providing pathways for lithium ion transport within the architecture, typically via migration and diffusion; iii) providing, in combination with the anode major surface, an interface across which lithium ions migrate; iv) providing an interface between it (the architecture) and a source of molecular oxygen (e.g., in an air cell, the interface between the cathode second surface and the ambient air or oxygen); v) providing internal pore volume (i.e., internal space) into which solid discharge product may accumulate during cell operation; and vi) providing gaseous channels which, preferably interconnected with the liquid filled pathways, serve as gas filled pathways to provide facile transport (e.g., via diffusion) of molecular oxygen into the depth of the architecture.

The porous cathode architecture has a porous structure of interconnected pores and liquid electrolyte imbibed in all or at least a portion of said pores. The porous structure may be defined by its pore size distribution, constituent pore composition, nature of the liquid electrolyte imbibed in the pores, or the solid material from which the porous architecture is composed, or any combination thereof. In accordance with the manner in which the instant invention is described, the pores may be categorized by pore size, constituent pore composition, and pore functionality.

When referring to pore size, it is meant pore radius, which is defined herein as a radius of a spherical pore having an equivalent volume. The pore size (or pore radius) may be described using a relative metric and/or a quantitative classification. When using a relative metric the pore size is characterized by using comparative language with terms such as large (or larger or largest), intermediate (or in-between) and small (or smaller, or smallest). Alternatively, a quantitative pore classification may be used, and, in particular, the one adopted herein has been uniquely formulated to correlate pore size with constituent pore composition and/or pore functionality. Specifically, the classification uses the term "macropores" to mean pores having radii greater than 100 nm; the term "mesopores" for pores having radii in the range of 100 nm to 1 nm; and the term "micropores" for pores having radii smaller than 1 nm. Macropores can be further subdivided into large macropores having radii greater than 1 um and small macropores having radii in the range of 1 um to 100 nm. Mesopores can be further subdivided into large mesopores having radii in the range of 100 nm to 10 nm and small mesopores having radii in the range of 10 nm to 1 nm.

When referring to pore composition, it is meant the composition of the primary constituent material in the pores. Commonly, the pore compositions are delineated in the broadest sense by the predominant material phase present in the pores, be it a gaseous material (i.e., a gas pore or gas filled pore) or a liquid material (i.e., a liquid pore or liquid filled pore), typically the liquid electrolyte employed in the architecture, or, in certain instances, a solid phase. For instance, in a pore that is initially gas or liquid filled, solid phase material may form as a result of cell reaction product precipitating as a solid and displacing the liquid or gas phase over the course of cell operation. Accordingly, because the pore composition may change over the course of cell operation, when referring to pore composition it is typically meant, unless otherwise specified, to mean the pore composition just prior to and upon initial cell operation (e.g., upon initial discharge). Furthermore, by use of the term "initial cell operation" it is meant one or the other of the initial discharge or initial charge, whichever is caused, by the operator, to occur first.

When referring to pore functionality, it is meant the primary function of the pore. Specifically: i) a gas filled through pore ("gas pore") provides channels for the diffusion of molecular oxygen from the oxygen source (e.g., ambient air, dry air, or oxygen) into the depth of the architecture; ii) a liquid filled through pore ("liquid pore") provides ion conductive pathways preferably throughout the architecture as a whole; and iii) a "storage pore" provides internal pore volume wherein cell reaction products preferentially accumulate, and, in preferred embodiments, the storage pores are positioned in the architecture to enhance capacity density by minimizing adverse effects of solid product precipitation, which can lead to premature cell polarization and an undue increase in cell impedance.

In various embodiments, the architecture includes two or more functional regions. A first porous region that serves to provide active surfaces on which electron transfer takes place (i.e., an "electron transfer region"), and a second porous region, with which the first porous region is in pore communication, that is sometimes referred to as passive region. By use of the term "pore communication" it is meant that the referenced pores are fluidly contiguous whereby said fluid may be a liquid or gas or combination thereof. In various embodiments the architecture has a single passive region, but the invention is not limited as such, and it is contemplated that two or more different passive regions may be employed. For example, two passive regions each having a different porous structure, and/or composed from different porous solid materials. The "passive regions" having surfaces across which electron transfer is sufficiently blocked to prevent electrochemical reactions from taking place thereon, and the material from which it (the passive region) is made is typically a porous electronically insulating solid.

In various exemplary embodiments the architecture is composed of a plurality of porous layers, with one porous layer serving as an electron transfer region and a second porous layer serving as a passive region.

However, the invention is not limited to multilayer architectures, and it is contemplated herein that the architecture is or comprises a unitary structure having two or more regions, wherein the surface properties of the various regions are intrinsic to the solid porous materials from which it (the region) is made, or by treating, e.g., surface treating, certain portions of the as fabricated unitary structure. By way of example, an electronically conductive carbon based porous unitary body, intrinsically conductive, provides electron transfer surfaces and a portion of the unitary carbon body treated (e.g., via coating) to effect an insulating surface; thus providing, in a single unitary structure, both a passive region and an electron transfer region. In various embodiments a passive region, composed entirely of liquid electrolyte filled pores, is positioned in the architecture nearby the anode active surface, and typically in direct contact with the anode surface, to provide a low resistance interface between the anode and the architecture.

Wettability of a pore surface by the liquid electrolyte, or a lack of wettability, is an important characteristic of the architecture. The term "wetting", "wetted" or "wettability" is generally used to describe the ability of a liquid to spread on a solid surface, and, in the case of a porous solid body, the ability of the liquid to displace the gaseous phase and imbibe the through-pores with the wettable liquid. Accordingly, when describing the wettability of a porous solid body consideration must be given to the nature of both the solid material from which the pore surface is composed as well as the liquid phase with which it (the pore surface) may or may not be readily wetted. As used herein a liquid is referred to as wettable if it readily wets or spreads over a solid surface or readily imbibes a porous solid body. A wettable liquid will flood a solid porous body provided sufficient liquid is present to fill all the pores. A non-wettable liquid resists spreading over a solid surface or imbibing a porous body, and, moreover, in the presence of excess liquid, a non-wettable liquid will not flood a porous body, as the non-wetting pore surfaces resist the liquid from displacing the gas phase.

In various embodiments certain portions or regions (e.g., porous layer or layers) of the architecture define surfaces that are readily wetted by the liquid electrolyte and, in certain embodiments thereof, the liquid does not wet the surfaces of certain other porous regions or portions. For instance, in various embodiments the pore surfaces of the electron transfer region or passive region or both regions are readily wetted by the liquid electrolyte employed in the architecture, and in certain embodiments thereof the entire architecture is readily wetted. With reference to FIG. 1 or 2, in various air cell embodiments the entire architecture is readily wetted except for a layer region immediately adjacent, or nearby, the molecular oxygen-permeable casing wall 155. The non-wetting layer, in the case of aqueous air cells, is hydrophobic, and, in the case of non-aqueous air cells, is not readily (or at all) wetted by the non-aqueous liquid electrolyte employed in the architecture.

In contradistinction to a non-wettable architecture (or non-wettable electron transfer region) wherein gas pores are created as a result of surface non-wettability, to effect gas pores within a completely wettable architecture, or, more particularly, to effect gas pores into the depth or interior of an entirely wettable electron transfer layer, in various embodiments the cells of the instant invention are constructed such that the architecture is in a "partially-dry state", or, as it is sometimes referred to herein, the architecture is "electrolyte starved." By use of the term partially-dry state (or partially-dry) or electrolyte starved it is meant that the volume amount of liquid electrolyte employed in the architecture is less than the total pore volume of those interconnected pores which are readily wettable by the liquid electrolyte. In various embodiments, wherein the architecture is partially dry but also entirely wettable by the liquid electrolyte, the amount of liquid electrolyte employed in the cell is less than the total pore volume of the architecture. It is important to note that when referring to the amount of liquid electrolyte employed (or present) in the architecture it is meant that amount which is present in the cell immediately after the cell has begun initial operation. This understanding is emphasized here to make it clear that a partially dry architecture serves an operating function in that it allows for the formation of gas pores within the bulk of the architecture, and that a partially-dry architecture is not meant to mean an architecture which is merely stored in a partially dry state prior to operation and then later filled with electrolyte volume sufficient to fill all the through pores or otherwise flood the architecture.

For lithium batteries (e.g., lithium ion batteries), employing an amount of liquid electrolyte that is insufficient to fill all the pores in the cathode is far from optimal and generally undesirable since the electrolyte provides ionic transport within the cathode and between the cell electrodes. In fact, to make up for electrolyte losses during discharge and charge, lithium batteries commonly use a flooded configuration where a small excess of electrolyte is employed to compensate for electrolyte decomposition that would otherwise lead to electrolyte dry out and ultimately capacity losses and early cell polarization. Li-oxygen batteries are susceptible to the same drawbacks, which is why the use of a partially dry cathode architecture opposes conventional wisdom. However, the partially dry architectures disclosed herein are not simply loaded with less electrolyte than what is necessary to fill all the through pores, the porous structure is also tailored, as described in more detail below, such that the gas pores form in only those regions that benefit cell performance, and are not formed in other regions of the architecture, specifically those regions which necessitate liquid filled pores, such as the region immediately adjacent, and in contact with, the anode major active surface. By this expedient, the instant invention enables high performing alkali metal oxygen cells having cathode architectures generally, and electron transfer regions in particular, which, albeit, entirely readily wetted by the liquid electrolyte contain both gas pores for fast oxygen diffusion and liquid pores for ion migration.

Thus, in accordance with various embodiments of the instant invention, the porous structure generally and the pore size distribution in particular is tailored in combination with the amount of liquid electrolyte employed in the architecture as means to control the constituent pore composition and pore functionality, and, in various embodiments, as described in more detail below, the porous structure is tailored for positional control over pore composition and pore functionality.

In various embodiments the partially dry cathode architecture includes an electron transfer region that is entirely and readily wetted by the liquid electrolyte but nonetheless contains both liquid and gas pores. The liquid pores are imbibed with the liquid electrolyte and the gas pores are substantially filled with an oxygen containing gas, such as that derived from the ambient air about the cell or fed into the architecture via an external source (e.g., from an oxygen tank as described above). The gas pores provide channels for the transport of molecular oxygen into and out of the depth of the electron transfer region(s), thus, vastly increasing the practical electroactive surface, and, by this expedient, enabling enhanced rate performance (e.g., the rate at which charging takes place) and power density (as measured in W/l or W/kg).

In other embodiments, the architecture has a flooded electrolyte configuration wherein the electron transfer region and passive region, when present, are entirely flooded with liquid electrolyte immediately prior and upon initial cell operation.

In various embodiments, the architecture's porous structure is enhanced or optimized by varying, as a function of architecture thickness, one or more of the pore size distribution, pore composition (e.g., liquid filled or gaseous filled), and solid material from which the architecture is composed.

In accordance with various embodiments of the instant invention, pore composition and/or functionality is tailored as a function of pore size by taking advantage of capillary forces that drive the liquid electrolyte to preferentially fill smaller pores first. For instance, in various embodiments, the cell, having a partially dry architecture, has a pore composition (of both gas and liquid pores) that is varied along the length of the architecture by tailoring the pore size distribution as a function of architecture thickness and carefully controlling the amount of liquid electrolyte employed in the architecture, and allowing capillary forces to drive the entire volume of liquid electrolyte to fill the relatively smaller pores until all the volume is used up, leaving behind larger gas filled pores. For example, the architecture composed of small liquid electrolyte filled pores of pore radii equal to or below a critical radii ($r^{crit}$) and large gas pores, substantially devoid of liquid electrolyte, which have pore radii greater than $r^{crit}$.

In various embodiments, the cell is fabricated by controlling the amount of liquid electrolyte employed in the architecture in combination with tailoring the pore size distribution and pore volume amounts. By way of example, in various embodiments the architecture is fabricated to have a certain pore volume derived from small pores having radii below $r^{crit}$ and a certain pore volume derived from large pores having radii greater than $r^{crit}$, and employing a volume amount of liquid electrolyte that is less than or equal to the cumulative small pore volume. In other embodiments having a partially dry architecture, $r^{crit}$ is defined by the volume amount of liquid electrolyte. For instance, the architecture composed of a range of pore sizes and filled with an amount of liquid electrolyte sufficient to fill some but not all the pores, with the largest liquid filled pores defining $r^{crit}$.

In various embodiments, to effect a thickness dependent porous structure, the architecture is composed of two or more porous body layers, e.g., a first porous body layer serving as a region in the architecture wherein electrochemical cathode reaction takes place (i.e., an electron transfer region as further described below) and a second porous body layer that serves as a region fully imbibed with liquid electrolyte to ensure a low resistance interface between the architecture and the anode active surface (e.g., a passive layer as described in more detail below).

In various embodiments the pore size distribution is varied along the length of the architecture such that the highest concentration of gas pores is positioned in a region nearby, or immediately adjacent to, the interface with the oxygen source (e.g., an air cell sidewall permeable to air or molecular oxygen-containing gas), and, in certain embodiments thereof, the gas pore concentration falls off sharply or gradually in the direction of the anode, until dropping substantially to zero in the region immediately adjacent the anode, and in particular the region in contact with the anode.

In various embodiments the architecture has a porous structure composed of both gas pores and liquid pores. In certain embodiments the gas pores are present in the electron transfer layer, and the layer adjacent the anode is substantially devoid of gas pores. In certain embodiments thereof, the electron transfer layer is the only layer in the architecture having gas pores.

In various embodiments, the second porous body layer, or an additional (e.g., third) porous body layer is incorporated within the architecture (typically between the first and second layers) to provide storage pores having a relative pore size (or pore size range) that is specifically tailored to drive the precipitation of cell reaction product away from the electron transfer layer, in order to prevent blocking the electron transfer sites, and, in certain embodiments, to drive the precipitation of reaction products away from the anode so as to lessen the likelihood of early precipitation of solid product at the anode/architecture interface, which, if otherwise allowed to form and accumulate, can lead to an increase in resistance and ultimately premature cell polarization.

In accordance with various embodiments the pore size distribution is tailored as a function of thickness, to preferentially drive liquid electrolyte into certain regions of the architecture by capillary forces, for instance, by stacking porous body layers of different pore size distributions.

In various embodiments the architecture includes two or more porous layers each having a different pore size distribution. For example, the first porous body layer can be an electron transfer layer having a broad pore size distribution that spans a wide range of radii and the second porous body layer can be monoporous (i.e., the pore size distribution is unimodal) and in some embodiments encompassed within the first layer pore size distribution, or, alternatively, the unimodal range outside the first layer pore size distribution (e.g., the unimodal pores larger (or smaller) than the largest (or smallest) pores in the first layer.

In accordance with the instant invention, the porous structure may be described using a relative metric of pore size or a quantitative classification. A number of quantitative pore size classifications are known in the various scientific arts. However, they are generally highly context-dependent and some of their delineations arbitrarily selected, so none are particularly suitable for characterizing the porous architectures disclosed herein. For instance, in the context of physisorption, the terminology macropore, mesopore, and micropore refer to pores with radii of about 50 nm for macropores, between 2 nm and 50 nm for mesopores, and less than 2 nm for micropores, respectively. The physisorption classification is far too narrow to be optimally useful for a description of the instant invention, especially because it is absent any further categorization of large pores having radii greater than 50 nm. Conversely, in the field of soil science, the emphasis is entirely weighted to very large pores wherein macropores are defined as being in the range of 75 um to 5 mm, mesopores in the range of 30-75 microns, and micropores in the range of 5 um to 30 um. To the best of the inventors' knowledge there is no known pore size classification sufficient to adequately characterize the cathode architectures described herein. Accordingly, the following classification system has been formulated which provides a correlation between the various pore size classes and pore functionality in the architecture. Specifically, the term "macropore" is used herein to refer to pores having radii greater than 100 nm; the term "mesopore" is used herein to refer to pores having radii between 1 nm and 100 nm; and the term "micropore" is used herein to refer to pores having radii less than 1 nm. Macropores can be further subdivided into large macropores having radii greater than 1 um and small macropores having radii in the range of 1 um to 100 nm. Mesopores can be further subdivided into large mesopores having radii in the range of 100 nm to 10 nm and small mesopores having radii in the range of 10 nm to 1 nm.

In addition to the aforementioned use of a relative metric and quantitative classification for describing the pore sizes, the pores may be described, or further characterized, by their function and composition, including: i) gas pores for providing channels through which molecular oxygen diffuses; ii) liquid pores for providing ionically conductive pathways through which ions migrate; and iii) storage pores in which solid discharge products preferentially accumulate during cell operation. In accordance with the instant invention the architecture includes at least liquid pores, and in various embodiments further contains gas pores and/or storage pores.

General Interior Cell Component Description

Figure 4:
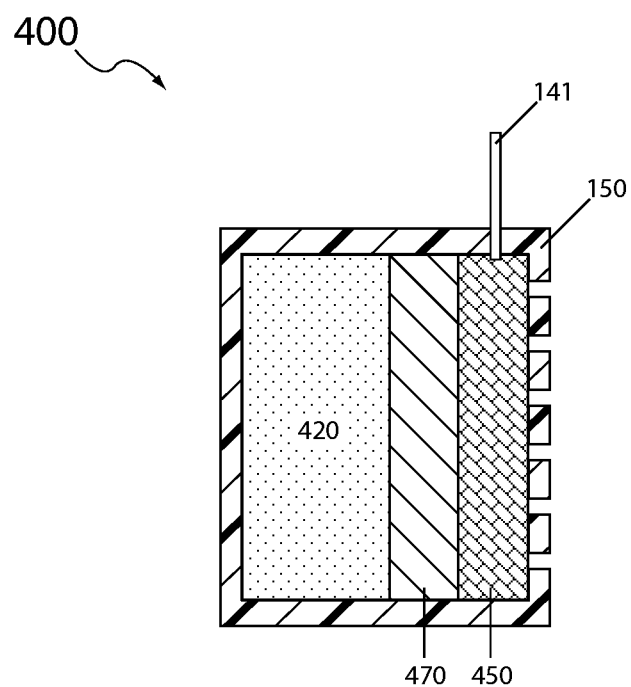
FIG. 4 is a schematic cross section of a battery cell in accordance with various embodiments of the instant invention.

In FIG. 4 there is illustrated the interior components of a lithium-air cell in accordance with various embodiments of the instant invention. The cell 400 includes a protected lithium anode 420 and a porous cathode architecture 410 composed of: i) a first porous body 450 that is an electron transfer medium (as described above) and positioned nearby the ambient air; ii) a second porous body 470 in contact with the electron transfer medium on one side and in contact with the anode on the other side; and iii) a non-aqueous liquid electrolyte present in at least a portion of the architecture pores.

The electron transfer medium 450 and second porous body 470 may be in layer form, and each may be a discrete monolithic layer or each may be a multilayer composed of a consecutive stacking of two or more compositionally similar layers. For instance, two or more discrete electron transfer layers each having a different porous structure such that when stacked the combination yields an overall porous structure that is a function of architecture thickness. Additional porous material layers are also contemplated. For instance a current collecting layer may be disposed on either exterior surface of the electron transfer layer or interposed between two electron transfer layers. A third or more porous body layer may be disposed between the first and second porous body for the purpose of providing precipitate storage pores within the bulk of the architecture or to further tailor the porous structure as a function of architecture thickness or, more generally, improve cell performance or manufacturability.

Electron Transfer Medium

Continuing with reference to FIG. 4, to effect a thickness dependent porous structure, the cathode architecture is composed of two or more porous body layers (i.e., a plurality of layers) wherein at least two of the layers have different pore size distributions, and at least one of the layers serves to provide active electron transfer surfaces on which the cathode electrochemical reactions take place, and that active layer sometimes referred to herein as the solid phase electron transfer medium layer, or more simply as the solid electron transfer layer or even more simply as the electron transfer layer or transfer layer or transfer medium.

The electron transfer medium may be a two-dimensional surface such as a planar catalytically active surface coated onto a substrate layer (e.g., a coating on a planar current collector such as graphite foil or a metal, e.g., nickel foil). More typically the electron transfer medium is a porous three-dimensional body (e.g., a porous body layer) having interior electron transfer pore surfaces and through porosity advantageous to effect, within the depth of the layer, one or more of the following functionalities: i) interior current collection; ii) internal pore space for storing solid phase discharge product; iii) internal ion conductive pathways (i.e., through-pores filled with liquid electrolyte); and iv) gaseous channels, randomly distributed or orderly arranged, that, interconnected with the liquid electrolyte filled through-pores, facilitate the desired cathode electrochemical reactions to occur within the depth of the cathode architecture. The gaseous channels are particularly useful for high power cells where the rate limiting step on discharge might otherwise be oxygen diffusion in liquid electrolyte flooded pores.

The solid phase electron transfer medium is electronically conductive and should provide sufficient surface area and high enough conductivity to sustain the electrical current that passes through the cell to avert undue polarization, which is detrimental to performance and particularly problematic for cells operated at high current drains or intended to undergo rapid charging.

Porous electron transfer mediums, along with providing high surface area, yield the advantage of interior current collecting functionality within the depth of the architecture. In various embodiments, the electron transfer medium carries electrical current from its active surfaces to a current collecting layer (also part of the architecture), such as an electronically conductive metal mesh, or directly to the cell's positive (cathode) terminal 141. However, the invention is not limited as such and the transfer medium may be the sole current collector in the architecture, interfacing, in direct contact, with the cathode terminal (typically a metal), and thus, in such embodiments, the transfer medium is generally metal based. For carbon based electron transfer layers, to ensure robust current collection a metal mesh (e.g., a nickel mesh) or metal based grid-like layer is typically incorporated in the architecture in electronic contact with the electron transfer layer, including wherein the current collecting layer is disposed in the interior of the electron transfer medium (e.g., sandwiched between two electron transfer layers), or placed on one or the other of the exterior surfaces, e.g., on the surface of the carbon layer opposite the ambient air. By way of example, the carbon electron transfer medium 450 may be coated onto a metal mesh current collector (not shown), and the cathode terminal 141 may be welded or soldered or physically crimped onto the current collector.

In various embodiments the transfer medium is composed of a single monolithic carbon layer (e.g., a carbon based layer). In other embodiments, the transfer medium is, itself, a multilayer medium, composed of, for example, a stacking of carbon layers. Stacking of layers provides a method for not only varying the transfer medium thickness. It also provides a method to vary the pore size distribution along the length (i.e., thickness) of the architecture.

In some embodiments, the solid phase electron transfer medium or combination of several such medium layers (i.e., a multilayer medium) represents the entirety of the cathode architecture, the medium, or multilayer medium, in direct contact with the anode major surface and the cell casing. In other embodiments, as described in detail further below, the electron transfer medium provides but one of two or several (i.e., 3 or more, e.g., 4, 5, 6, 7 or 8) porous material layers which, not electron transfer mediums, impart certain advantageous properties and in combination define the cathode architecture.

In embodiments, the porosity (i.e., through pore volume) of the solid electron transfer medium provides a significant portion of the total pore volume of the architecture. For instance, in embodiments the percentage of the total architecture pore volume (porosity) provided by the solid phase electron transfer medium is between 15%-20%; 20%-25%; 25%-30%; 30%-35%; 35%-40%; 40%-50%; 50%-60%; 60%-70%; 70%-80%; 80%-90%; and in certain embodiments greater than 90%. In those embodiments for which the solid phase electron transfer medium (or multilayer medium) is the architecture itself, the medium provides 100% of the architecture pore volume.

In various embodiments the porous structure of the electron transfer medium has a pore size distribution inclusive of two or more, for instance three, four or five, pore size modes or ranges. For instance a pore size distribution which includes micropores and macropores, and, in certain embodiments thereof, may also be inclusive of mesopores, with all such pore sizes as defined above in the aforementioned classification. In various embodiments the porous structure may be one or more of hierarchical, randomly distributed, or constructed in an arranged non-random fashion. In certain embodiments the solid phase electron transfer medium is composed, in part, of mesopores, which provide between 2%-5%; 5%-10%; 10%-15%; 15%-20%; 20%-25%; 25%-30%; 30%-35%; 35%-40%; 40%-50%; 50%-60%; 60%-70%; 70%-80%; 80%-90%; and in certain embodiments greater than 90% of the total pore volume in the medium. In various embodiments all or some of the surfaces of the solid phase electron transfer medium are coated with one or more catalysts to facilitate and/or accelerate the desired electrochemical reactions in the cathode. In certain embodiments the micropore surfaces are preferentially coated with said catalyst(s). For instance, all or a majority of the catalyst coating or catalyst particles are present on the surfaces of the micropores as opposed to being primarily present, or present at all, in or on the surfaces of the mesopores or macropores. Moreover, in preferred embodiments, the macropores, which may be devoid, or mostly devoid, of liquid electrolyte and therefore serve the function of gaseous channel, are also devoid of the catalyst coating or catalyst particles. To achieve such preferential coating, capillary forces can be taken advantage of. For instance, during cathode fabrication, the catalyst may be dissolved in a solvent or dispersed in a carrier liquid and dispensed into the porous solid phase transport medium, or the electron transfer medium dunked or dipped into the catalyst solution or dispersion. Once it is wetted, capillary forces drive the catalyst solution to preferentially disperse into the smaller pores of the electron transfer medium. In one method, an amount of catalyst solution or liquid dispersion, which is less than the total pore volume of the electron transfer medium but sufficient to fill the amount of micropores desired to be catalyzed (e.g., sufficient to fill all, or 80%, or 50% or 20% of the volume provided by micropores), is dispensed into the electron transfer layer, and the solvent or liquid carrier allowed to evaporate, leaving behind the catalyst coating of catalyst particles in the smaller pores (e.g., micropores or small mesopores), with preferably very little or only remnant, if any, amount of catalyst in the largest pores (e.g., macropores or large mesopores). In other embodiments the solid phase transport medium may be dipped directly into a catalyst solution as described above, and allowed to evaporate whence removed. As the liquid evaporates the remaining solution or dispersion will be driven into the micropores and the catalyst primarily deposited on the micropore surfaces, with preferably only a marginal amount or negligible amount of catalyst on the surfaces of the larger pores (e.g., the large mesopores or macropores or both). The amount of catalyst loading is adjustable; for example, by using the aforementioned impregnation techniques and modifying the catalyst solution concentration, the amount of solution applied to the transfer medium, or the number of solution applications, or some combination thereof. In embodiments the percentage of the electron transfer surface coated with catalyst is generally less than 10%, and typically between 0.1% and 10%, e.g., about 1%, 2%, 3%, 4%, 5%, and up to 10% in increments of about 1%. In various embodiments the porous electron transfer medium includes through-pores some of which are filled, entirely or mostly, with liquid electrolyte and others filled, entirely or mostly, with gas phase (e.g., ambient air or oxygen). While in certain embodiments, to effect gaseous channels, the invention contemplates using a de-wetting agent on a certain percentage of the pore surfaces, in most embodiments the invention provides another mechanism for introducing gaseous channels into the depth of the architecture which requires filling (the cathode architecture) with an amount of liquid electrolyte that is less than the total pore volume of the architecture and tailoring the porous structure as a function of thickness to control the location of the gaseous and liquid pores. Accordingly, this technique, which, in leaving the architecture partially dry, could potentially be disadvantageous in regards to the overall ionic conductivity and continuity of the liquid electrolyte phase, is utilized for advantage herein by tailoring the porous structure as a function of the architecture length. Specifically, in various embodiments, the architecture contains a certain percentage of large pores and small (or smaller) pores whereby the liquid electrolyte, driven by capillary forces, preferentially fills the smaller pores, leaving the larger pores, substantially devoid of liquid, to serve as gas pores for fast oxygen transport in the depth of the architecture generally and in particular into the depth of the electron transfer region (or electron transfer layer). By this expedient, there is no need for a non-wetting agent to be employed in the architecture and the choice of suitable active surface materials is expanded to include those which have surfaces that are readily wetted by the non-aqueous electrolyte employed in the architecture. Accordingly, in various embodiments the solid electron transfer medium is composed entirely of a material the surfaces of which are wettable by the liquid electrolyte, and yet the medium, even whence filled with liquid electrolyte, retains sufficient gas porosity to serve as oxygen supply channels throughout the architecture. Thus the choice of non-aqueous liquid electrolytes and electron transfer mediums are greatly expanded to include those which have a relatively close polarity, as well as to include liquid electrolytes which, when applied to the transfer medium surfaces, have a contact angle that is less than 90 degrees (i.e., readily wettable). Suitable electron transfer mediums include porous material layers composed of metals or electronically conductive carbons, or combinations thereof, and in various geometric forms. Particularly suitable metal layers include nickel, stainless steel, aluminum, and titanium open cell foams (e.g., reticulated foams and nanofoams such as aerogels) or fiber papers. It is also contemplated herein that a porous, yet insulating, layer (such as a polymeric fiber based paper or foam) having coated on its surface a conductive layer, sufficient in thickness and electronic contiguity, to be used herein as a solid electron transfer medium or as a substrate on which catalyst materials may be coated to provide enhanced active sites within the architecture.

In various embodiments the solid phase electron transfer medium is, or includes as a substrate, a carbon layer. For instance, a layer of carbon foam, carbon cloth, carbon aerogel, carbon nanofoam, reticulated carbon, and carbon papers may be used to provide a highly open substrate which is impregnated or further coated with high surface area carbon particles (e.g., carbon powder) to provide the necessary electrochemically active surface area to facilitate the cathode reactions. In other embodiments the solid phase electron transfer medium may itself be a layer of carbon based slurry pressed or coated as a free standing layer or onto a suitable open layer current collecting substrate, such as a metal mesh (e.g., nickel). The amount of carbon particles added to the matrix in the form of slurry or included in the coating or pressed layer depends on the application in which the cell is intended. In formulating the layers, greater surface area is achieved with higher loading volumes of high surface area carbons, which may be coated or pressed into the large voids of a highly porous carbon layer such as a paper substrate. Accordingly, the amount of active surface area and volume of micropores, mesopores and macropores may be adjusted by varying the amount of high surface area carbon particles loaded (e.g., via impregnation) into the porous substrate, and the type of utilized porous carbon substrate, which can be paper, cloth or foam.

To maintain structural integrity the carbon particles are typically coated along with a binder material to provide or enhance adhesion to the substrate as well as cohesion between carbon particles. Suitable binders include polymers such as polyethylene oxide (PEO), polyvinylidene fluoride (PVdF) and polytetrafluoroethylene (PTFE). A slurry or paste is generally formulated and coated or pressed onto/into the substrate. In forming the slurry/paste the binder(s) and carbon(s) are mixed together typically in or with the aid of a liquid solvent, which may be selected to dissolve the binder, if so desired. The rheology of the slurry/paste is readily adjusted by modifying the formulation to a desired viscosity and carbon to binder ratio. Compositional formulations and processes for preparing carbon binder based slurries/pastes and for incorporating them onto or into a carbon based substrate layer (such as a carbon paper or carbon cloth having open cells or voids) are well known in the art as are methods for making and tuning the porous structure of porous carbon layers suitable for use as electron transfer layers, including such methods as are described in the following references, all of which are hereby incorporated by reference in their entirety for their disclosure of these methods: i) the book entitled "Electrochemical Oxygen Technology", written by Kim Kinoshita (ISBN: 978-0-471-57043-1), copyright June 1992; ii) a paper titled: Hierarchical macroporous carbon processed with ethylene glycol and starch as double porogens, and published in the Journal of Materials Letters, Volume 64, Issue 24, 31 Dec. 2010, Pages 2696-2699, Guiwu Liu et al.; iii) US Patent Application 20100189991 entitled Macroporous Carbon Nanofoam composites and methods of making the same.

There is generally a tradeoff between the carbon surface area and the available pore volume. The pore size distribution is adjustable, in part, by adjusting or optimizing the carbon slurry composition, carbon substrate porous structure and the type and loading amount of high surface area carbon impregnated or coated into/onto the substrate. Accordingly, in various embodiments the porous structure of the electron transfer medium includes two of the following types of pores: macropores, mesopores or micropores, and in certain embodiments all three types of pores are present. In various embodiments the ratio of the sum of micropore and small mesopore volumes to macropore volume is about 10:1, 5:1 and 2:1. In various embodiments the architecture porous structure as a whole, and, in certain embodiments thereof, that of the solid electron transfer medium in particular, may be varied along the architecture thickness by stacking a plurality of two or more porous body layers each serving as an electron transfer medium. As mentioned above, the solid electron transfer medium may itself be built up from a stacking of such said medium layers, each having a similar or different porous structure, and in various embodiments the architecture as a whole may be built up from a stacking of two or more porous body layers. For instance a first porous body layer that is a solid electron transfer medium and a second porous body layer, not a solid electron transfer medium, e.g., an electronically insulating porous body layer which may be incorporated in the architecture to provide a pore size distribution nearby the anode which preferentially retains liquid electrolyte or, in the same or other instances, the multi-layer architecture providing a layer (e.g., an electron transfer layer) containing porous regions configured to provide internal space that serves as a reservoir in which, relative to other pore regions, preferentially receives cell reaction product, and by this expedient reduces the negative impact that would otherwise result from the buildup of copious amounts of solid discharge product in the architecture.

Passive Layer

Continuing with reference to FIG. 4, in various embodiments the second porous body layer is not an electron transfer medium, and is typically electronically insulating; for example, the second porous body layer may be a passive layer as described above. However, in some embodiments this porous layer can be fabricated from an electrically conductive material, for instance carbon.

In various embodiments, as shown in FIG. 4, the passive layer is placed in direct contact with the anode major surface on one side of the passive layer and in contact with the adjacent surface of the neighboring electron transfer medium on the other side. The passive porous body may be a monolithic single layer or it may be composed of a plurality of passive layers to effect a desired variation in the pore size distribution of the passive region as a function of architecture thickness. In various embodiments the passive layer is monoporous, meaning that the layer has a single mode of pores, and in some embodiments that single mode belongs to the class of macropores or mesopores, while in other embodiments the unimodal passive layer is microporous. However, the invention is not limited to unimodal passive layer embodiments, and in various embodiments the architecture includes a passive layer having a pore size distribution defined by a range of pore sizes, including macropores and/or mesopores, or, in other embodiments a range of micropores, or some combination thereof.

The passive layer is typically composed of a porous solid body that is intrinsically insulating, such as a porous polymer sheet, or glass fiber mat, or a porous insulating ceramic. Particularly suitable microporous polymer sheets are made from polyolefins, such as polyethylene, polypropylene and combinations thereof. Polymer sheets suitable for use herein as a microporous unimodal passive layer are commonly used in the art as a battery separator material, e.g., that which is used as a separator in lithium ion batteries. In other embodiments the passive layer may be a gel or a polymer swelled by the liquid electrolyte.

Particularly suitable macroporous/mesoporous passive layers include fiber mats and cloths, such as glass mats (e.g., of the absorptive glass mat type or fiberglass tissue) and generally porous non-woven fabrics such as polyester non-woven fabrics as well as those which are described in: US Pat. Application No.: 20120015228. Other materials suitable for this application include porous metal oxide materials such as porous $ZrO_2$ cloths and felts (in particular, zirconia cloth from Zircar Zirconia Corp., high porosity zirconia felts ZYF-150, ZYF-100 and ZYF-50 from Zircar Zirconia Corp.), porous $Al_2O_3$ cloths and felts (in particular, high porosity alumina felts ALF-100 and ALF-50 from Fuel Cells Materials Corp.) as well as porous $Y_2O_3$, MgO materials. Porous carbonaceous materials such as carbon and graphite cloths and felts, carbon papers and other porous structures are also suitable as solid porous reservoir structures (in particular, WDF graphite felt and VDG carbon felt from National Electric Carbon Products, Inc. and carbon felt from Fiber Materials, Inc).

Non-Aqueous Liquid Electrolyte

In various embodiments the liquid electrolyte employed in the architecture is a non-aqueous liquid electrolyte of sufficient lithium ion conductivity to support the electrical current through the cell and is preferably electrochemically stable at the oxygen reduction potential, and in the case of a secondary battery has a voltage window stable to both reduction and oxidation of molecular oxygen.

Suitable non-aqueous electrolytes are described in US Patent Application Publication No.: 20070117007 to Visco et al. entitled Li/Air Non-Aqueous Batteries, and which is hereby incorporated by reference for the disclosure of these non-aqueous electrolytes. In certain embodiments the non-aqueous electrolyte includes at least one "dissolving solvent" capable of dissolving lithium peroxide, such as the amide based solvents (e.g., DMF, DMAc and DMSO). As used herein the term dissolving solvent refers to a solvent capable of dissolving more than 1000 ppm of $Li_2O_2$. Preferably the $Li_2O_2$ solubility in the dissolving solvent is greater than 1% by weight, and even more preferably greater than 5% by weight, and even more preferably, more than 10% by weight. In preferred embodiments the volume percent of the dissolving solvent in the electrolyte is greater than 50% by volume, and even more preferably greater than 75% by volume. In certain embodiments the solvent system of the non-aqueous liquid electrolyte is entirely composed of so-called dissolving solvents.

In embodiments, particularly suitable non-aqueous liquid electrolyte solvents are DMF, DMAc and DMSO. In various embodiments the liquid electrolyte is chosen for its wettability in contact with the solid electron transfer medium. Organic liquid solvents, compared to water, have a low dielectric constant and significantly lower surface tension relative to that of water. Accordingly, in various embodiments the non-aqueous liquid electrolyte readily wets all the surfaces of the porous electron transfer medium, and in particular those which are carbon based, and even more particularly carbon based electron transfer mediums which have a binder, for instance a PTFE binder. Accordingly, in various embodiments the electrolyte employed, whether it be used in a partially dry or flooded configuration, would, in fact, readily flood or saturate the porous solid electron transfer medium if it were provided in sufficient amount larger than the architecture total pore volume.

Moreover, while the invention is described in various embodiments to have an architecture employing a non-aqueous liquid electrolyte, the teachings of the present invention are equally suitable for use with aqueous electrolytes, including those described in US. Patent Application Publication No.: 20090311596 to Visco et al, entitled Catholytes for Aqueous Lithium/Air Battery Cells, and which is hereby incorporated by reference for its disclosure of these aqueous electrolytes.

Solubilizing Agents

In various embodiments the non-aqueous liquid electrolyte employed in the cathode architecture further comprises a certain amount of a solubilizing agent that aids in the dissolution of a cell discharge product). The solubilizing agent may be incorporated in the electrolyte to cause dissolution of solid phase product as it forms in the electron transfer pores or to prevent solid phase product from forming in the electron transfer pores, by helping to dissolve solid product or by keeping the discharge product in solution such that it may diffuse away from the electron transfer pores to other regions of the architecture for which solid precipitation is less detrimental. For instance, in various embodiments the reaction product forms in the relatively small electron transfer pores (e.g., micropores or small mesopores) present in the electron transfer region 450 and can be redistributed into larger liquid pores of intermediate size (e.g., large mesopores or small macropores) which may be present in the electron transfer region (e.g., layer) or which may be part of a different region of the architecture, such as a second passive layer, not shown in FIG. 4 but interposed between the layers 450 and 470, having intermediate sized storage pores which are larger than the small electron transfer pores. Preferably, in such embodiments, the passive layer is positioned in the architecture, or at least the storage pores of the passive layer are positioned in the architecture, to minimize adverse effects of precipitation. For instance said storage pores of intermediate size located in a region of the architecture between the electron transfer region where the electron transfer pores are positioned and the first passive region 470 nearby the anode, which is defined, in part, by the presence of small liquid pores (e.g., micropores).

Suitable solubilizing agents include anion receptors such as i) those which interact with anions by means of hydrogen bonds, including calixarenes and calixpyrrole derivatives, Aza-ethers, and receptors containing urea, urethane, amide, pyrrole, hydroxyl groups; ii) those which interact with anions by means of ion-dipole interactions, including Aza-ethers, Cryptands containing $N^+ \ldots B—R_3$ groups, and receptors containing sulfoxide and phosphoroxide groups; iii) those which interact with anions by means of ion-ion interaction, including protonated and other positively charged aromatic and aliphatic amines such as polyammonium macrocycles and ammonium containing anion receptors containing guanidine and amidine groups, pyrrolic receptors such as porphyrine derivatives; and iv) those which interact with anions by means of lewis-acid-lewis base interaction, including organic compounds, such as those which are Boron containing (e.g., boroxines, boranes, boronates and borates). For instance, boroxines such as trimethoxyboroxine and tri(methoxyethoxyethoxyethoxy)boroxine; boranes such as tris(pentafluorophenyl)borane; and boronates such as: i) 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl phenyl)-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetrakis(trisfluoromethyl)-1,3,2-dioxaborol, 2-(3,5-difluorophenyl-4,4,5,5-tetrakis(trisfluoromethyl)-1,3,2-dioxaborolane, 2-pentafluorophenyl-4,4,5,5-tetrakis(trisfluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoro-isopropyl)(pentafluorophenyl)boronate; and borates such as trimethylborate, triphenylborate, tris-(2,2,2-trifluoroethyl)borate, tris-(1H,1H-heptafluorobutyl)borate, tris-(2H-hexafluoroisopropyl)borate, tris-(2,4-difluoroethyl)borate, tris-(2,3,5,6-tetrafluorobutyl)borate, tris-(pentafluorophenyl)borate, tris-(3-trifluoromethylphenyl)borate, tris-(3,5-bis(trifluormethyl)phenyl)borate, tris-(2,3,5,6-tetrafluorophenyl)borate, tris(perfluoro-t-butyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, tris(4-fluorophenyl)borate, tris(2,4-difluorophenyl)borate.

Other organic anion receptors suitable for use herein as a solubilizing agent include organic compounds comprising aluminum, including those which have Al—C bonds (e.g., $AlR_3$), or Al—O—C bonds ($Al(OR)_3$).

Inorganic Lewis acid salts such as $AlCl_3$, $AlBr_3$, $SnCl_4$, and $BF_3$, may also be suitable herein as solubilizing agents.

Another class of anion receptors suitable for use herein as a solubilizing agent in the liquid electrolyte is anion receptors which interact with anions by means of hydrophobic interaction, such as β-cyclodextrin.

In embodiments the concentration of anion receptors in the liquid electrolyte include that from 0.05 mole/L (M) to 2.5M, e.g., about 0.1M, 0.2M, 0.3M, 0.4M, 0.5M, 0.6M, 0.7M, 0.8M, 0.9M, 1M, 1.1M, 1.2M, 1.3M, 1.4M, 1.5M, 1.6M, 1.7M, 1.8M, 1.9M, 2.0M, 2.1M, 2.2M, 2.3M, 2.4M, and 2.5M.

In preferred embodiments the non-aqueous liquid electrolyte includes an anion receptor and at least one amide solvent. In certain embodiments, the non-aqueous electrolyte is amide based (i.e., the majority of solvents in the electrolyte are amides) and includes at least one anion receptor. In particular embodiments the only solvents in the liquid electrolyte are amides, the electrolyte also further comprises an anion receptor. In various embodiments the solubilizing agent is a boroxine, boronate, borate, or borane (e.g., tris(pentafluorophenyl)borane)

In various embodiments the electrolyte further comprises a supporting salt. In lithium-oxygen cell embodiments particularly suitable lithium salts include $LiPF_6$, $LiBF_4$, $LiAsF_6$, $LiSO_3CF_3$, $LiN(CF_3SO_2)_2$ or $LiN(SO_2C_2F_5)_2$, typically in a concentration range between 0.05M and 2M (e.g., about 0.2M, 0.3M, 0.4M, 0.5M, 0.6M, 0.7M, 0.8M, 0.9M, 1.0M).

In a particular embodiment, the catholyte composition is 1 M $LiN(CF_3SO_2)_2$; 0.25 M tris(pentafluorophenyl)borane in dimethylformamide (DMF).

Protected Lithium Electrode

Figure 5A:
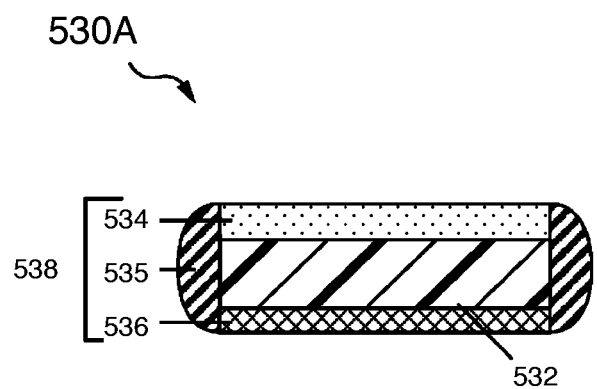
FIG. 5 is a schematic cross section of protected lithium electrodes suitable for use in accordance with various embodiments of the instant invention.
Figure 5B:
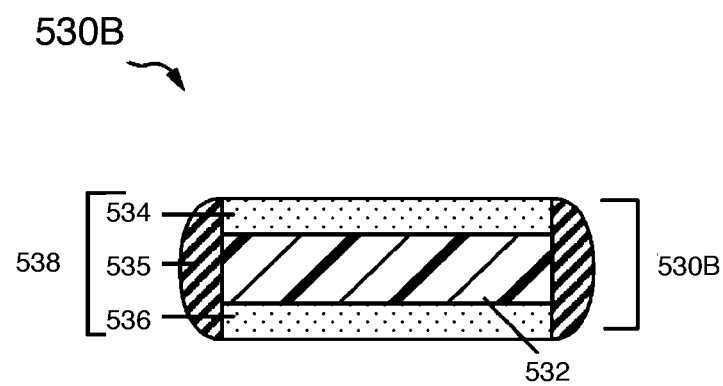

With reference to FIGS. 5A and 5B there are illustrated two embodiments of a protected lithium electrode that are particularly suitable for use in the battery cells of the present invention.

The protected lithium electrode 530A in FIG. 5A is termed single-sided which is to mean that it has one active surface out of which lithium ions migrate when the cell is discharged, and an opposing inactive surface defined by the anode backplane 536. The protected lithium electrode 530B in FIG. 5B is termed double-sided which is to mean that it has two opposing active surfaces, a first and second active surface.

With reference to both FIGS. 5A and 5B, the protected lithium electrode 530A and 530B includes a lithium electro-active component layer 532 (e.g., lithium metal foil) hermetically sealed inside an anode enclosure 538 which has a wall component defined by a lithium ion conductive protective membrane architecture 534 and another wall component, referred to herein and elsewhere, as the anode backplane 536. In various embodiments, which are described in more detail below, the anode backplane may be a second protective membrane architecture, or a current collector, or a supporting substrate. The protective membrane architecture has an interior surface facing the inside of the anode compartment and an exterior surface opposing and exposed to the external environment about the anode enclosure, and in like manner the anode backplane has an interior and exterior surface.

Herein above and below, when making reference to the active surface of the protected anode (i.e., the "protected anode active surface") it is meant that surface in direct contact with the electrolytic solution of the cell (i.e., the electrolyte in contact with the cathode, i.e., the catholyte) and across which lithium ions migrate out of the anode enclosure during cell discharge (i.e., the exterior surface of the protective membrane architecture). In accordance with the present invention, the exterior surface of the protective membrane architecture (i.e., the protective membrane architecture exterior surface) is the active surface of the protected anode (i.e., the protected anode active surface).

The lithium electro-active component layer 532 comprises a lithium electro-active component material, and the layer is sometimes referred to herein as the anode active layer, or more simply the anode layer for the sake of simplicity. The anode layer, flat and sheet-like, is interposed between the protective membrane 534 and the backplane 536. The anode layer may be a lithium metal foil or it may be a layer of a lithium electro-active component material, such as the active coating of a lithium intercalation anode commonly employed in conventional lithium ion batteries. Suitable alkali metal electroactive component materials include lithium metal, sodium metal, lithium alloys (e.g., LiAl), sodium alloys and intercalation materials (e.g., lithium metal, lithium alloys, and lithium intercalation host materials such as graphitic like carbons); including, but not limited to, these materials in sheet, coating, sinter, and foil form (e.g., lithium metal foil).

The anode layer has two opposing surfaces, a first active surface and a second surface. In the double-sided anode embodiment 530B the second surface is active and in the single sided embodiment 530A it is inactive.

The anode layer 532 is sandwiched between the protective membrane architecture 534 and the anode backplane 536, with the first active surface of the anode layer (e.g., lithium metal foil) opposing, typically in direct contact, the interior surface of the protective membrane architecture, and the anode layer second surface opposing the interior backplane surface.

A seal structure 535 interfacing with the protective membrane architecture and anode backplane seals the anode layer in an anode compartment, and thus forms the anode enclosure 538.

With reference to FIG. 5B, the protected anode 530B is double sided and the anode backplane 534 is a second protective membrane architecture arranged in like manner to that of the first protective membrane and therefore not repeated here. With reference to FIG. 5A the protected anode 530A is single-sided, and the anode backplane 536 is not a protective membrane. In such instances the anode backplane may be electronically conductive and serve as a substrate for the anode layer and/or as a current collector, or the anode backplane may be electronically insulating, for instance the anode backplane may be contiguous with the seal structure, e.g., the seal structure a multi-layer laminate heat sealed to the exterior surface of the protective membrane architecture. As described later below, an anode backplane serving as a current collector (i.e., the exterior surface of the anode backplane) may be coated with a cathode active layer to form a bi-polar protected electrode.

The enclosure, which is formed by the protective membrane architecture and anode backplane interfacing with the seal structure 535 (e.g., joined by bonding), may be rigid or compliant. A compliant seal structure is compliant to changes in anode thickness and this property may be derived by the material properties of the seal structure, e.g., the seal structure a flexible multi-layer laminate. For instance, the compliant seal structure may be in the form of a frame sealed (e.g., by bonding) around the periphery of the backplane and membrane, and thus covers the edges of the anode layer. Typically the bond, e.g., a heat seal when the seal structure is a heat sealable multi-layer laminate, is applied to the exterior surfaces of the backplane and membrane and thereon also covers their respective edges. If rigid, the seal structure may be an open ended container, e.g., a cup shaped polymer having a recess for receiving the anode layer and the membrane architecture sealed to the lip of the cup, or the seal structure may be a rigid polymeric annulus capped on one end by the membrane and on the other end by the backplane.

Protected anodes (e.g., protected lithium electrodes) and methods of making protected anodes having both compliant seal and rigid seals, and which are particularly suitable for use herein as a protected anode in the battery cells of the instant invention, are fully described US Patent Application No.: 2007/0037058 and US Patent Application No.: US 2007/0051620 to Visco et al., and are hereby incorporated by reference in their entirety for this purpose.

The protective membrane architecture 534 is chemically stable to both the electroactive lithium layer and the external environment. The protective membrane architecture typically comprises a solid electrolyte membrane and an interlayer. The protective membrane architecture is in ionic continuity with the active anode layer and is configured to selectively transport Li ions out of the anode enclosure while providing an impervious barrier to the environment external to the anode (e.g., seawater). Protective membrane architectures suitable for use in the present invention are described in applicants' co-pending published US Applications US 2004/0197641 and US 2005/0175894 and their corresponding International Patent Applications WO 2005/038953 and WO 2005/083829, respectively, incorporated by reference herein.

FIGS. 6A-D illustrate representative protective membrane architectures from these disclosures suitable for use in the present invention. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 6A:
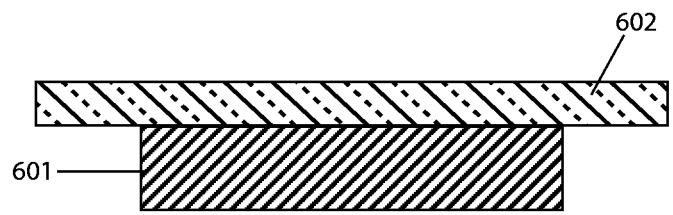
FIG. 6 is a schematic cross section of protected anode architectures suitable for use in accordance with various embodiments of the instant invention.

Referring to FIG. 6A, the protective membrane architecture can be a monolithic solid electrolyte 634 that provides ionic transport and is chemically stable to both the active metal anode 632 and the external environment. Examples of such materials are Na-beta alumina, $LiHfPO_4$ and NASICON, Nasiglass, $Li_5La_3Ta_2O_{12}$ and $Li_5La_3Nb_2O_{12}$. $Na_5MSi_4O_{12}$ (M: rare earth such as Nd, Dy, Gd).

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 6B:
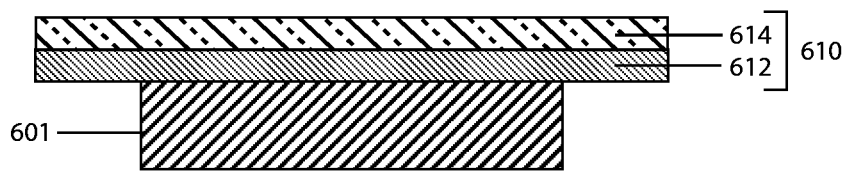
Figure 6C:
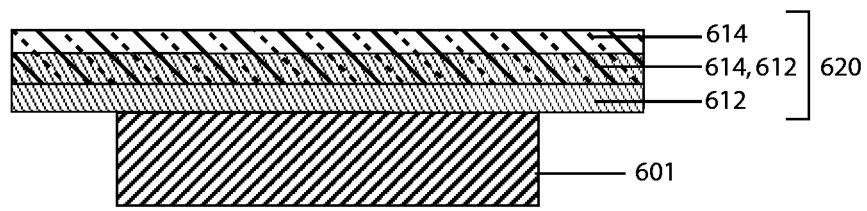

Referring to FIG. 6B, the protective membrane architecture can be a composite solid electrolyte 134 composed of discrete layers, whereby the first material layer 612 (also sometimes referred to herein as "interlayer") is stable to the active metal anode 632 and the second material layer 614 is stable to the external environment. Alternatively, referring to FIG. 6C, the protective membrane architecture can be a composite solid electrolyte 634 composed of the same materials, but with a graded transition between the materials rather than discrete layers.

Generally, the solid state composite protective membrane architectures (described with reference to FIGS. 6B and 6C) have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/CM to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 6D:
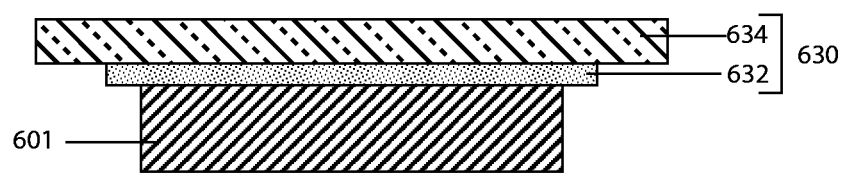

A fourth suitable protective membrane architecture is illustrated in FIG. 6D. This architecture is a composite 634 composed of an interlayer 632 between the solid electrolyte 634 and the active metal anode 632 whereby the interlayer is impregnated with anolyte. Thus, the architecture includes an active metal ion conducting separator layer with a non-aqueous anolyte (i.e., electrolyte about the anode), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 6D) generally shares the properties of the second material layer for the composite solid state architectures (FIGS. 6B and C). Accordingly, the solid electrolyte layer of all three of these architectures will be referred to below as a second material layer or second layer.

A wide variety of materials may be used in fabricating protective composites in accordance with the present invention, consistent with the principles described above.

For example, in the solid state embodiments of FIGS. 6B and C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such incomplete conversions (also sometimes referred to as composite reaction products) meet the requirements of a first layer material for a protective composite in accordance with the present invention and are therefore within the scope of the invention.

For the anolyte interlayer composite protective architecture embodiment (FIG. 6D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. In the case of sodium, suitable anolytes will include active metal salts such as $NaClO_4$, $NaPF_6$, $NaAsF_6 NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4Li_2SiS_2$, $Li_2SGeS_2Ga_2S_3$, $Li_2O_{11}A_{12}O_3$, $Na_2O_{11}Al_2O_3$, $(Na,Li)_{1+x}Ti_{2-x}Al_x(PO_4)_3$ (0.1=x=0.9) and crystallographically related structures, $Li_{1+x}Hf_{2-x}Al_x(PO_4)_3$ (0.1=x=0.9), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety in this regard.

A particularly suitable glass-ceramic material for the second layer of the protective composite is a lithium ion conductive glass-ceramic containing a predominant crystalline phase composed of $Li_{1+x}(M,Al,Ga)_x(Ge_{1-y}Ti_y)_{2-x}(PO_4)_3$ where X=0.8 and 0=Y=1.0, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where 0<X=0.4 and 0<Y=0.6, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622 incorporated herein by reference for their disclosure in this regard.

Another particularly suitable material for the second layer of the protective composite is lithium ion conducting oxides having a garnet like structures. These include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta) $Li_{7+x}AxLa_{3-x}Zr_2O_{12}$ where A may be Zn. These materials and methods for making them are described in U.S. Patent Application Pub. No.: 2007/0148533 (application Ser. No. 10/591,714) and is hereby incorporated by reference in its entirety and suitable garnet like structures, are described in International Patent Application Pub. No.: WO/2009/003695 which is hereby incorporated by reference for all it contains in this regard.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

The solid electrolyte membrane defines the exterior surface of the protective membrane architecture, and it may have a homogenous composition or a composition that varies with thickness, for instance a graded or discrete variation (e.g., the solid electrolyte membrane itself a laminate composite of multiple layers, having discrete or gradual interfaces).

Compositionally varied solid electrolyte membranes provide benefit in that the surfaces and bulk compositions may be tailored to achieve an optimal membrane as it pertains to chemical compatibility of their respective surfaces in contact with a reference material and bulk conductivity. For example, one particularly suitable solid electrolyte membrane for use in the protected anode has a surface composition with a lithium ion conductivity that is substantially less than that of the bulk membrane composition. By this expedient, the rate of ion exchange between lithium ions in the membrane and sodium ions from the seawater is lessened relative to that for a membrane having a highly conductive surface composition (e.g., that of the bulk composition or higher). For instance, the first surface of the membrane may be composed of a first lithium ion conducting composition, preferably having conductivity in the range of $10^{-6}$ S/cm to $10^{-4}$ S/cm and the bulk composition having conductivity preferably greater than $10^{-4}$ S/cm. Although the surface and bulk must be compositionally different in order to bring about the conductivity difference, it is preferable from the perspective of compatibility and processability that the bulk and surface compositions have some similarity, such as both compositions being a lithium titanium phosphate or both compositions having the same, or similar, crystal structure. For example, a membrane having a bulk composition of $LiTi_2(PO_4)_3$ (about $10^{-3}$ S/cm at room temperature) and a surface composition close to that of the bulk but doped with ions such as Al, Ga, and/or Ge to reduce the conductivity e.g., $Li_{1+x}(Al,Ga)_x(Ge_{1-y}Ti_y)_{2-x}(PO_4)_3$ (reduce to below $10^{-4}$ S/cm at room temperature) would be suitable to suppress lithium ion exchange with sodium ions in the seawater.

Specific Architecture Porous Structures

First Specific Embodiment

With reference to FIG. 4, in a first specific embodiment the instant battery cell 400 has an architecture that is both partially dry and entirely wettable.

The porous structure, and in particular the pore composition, is tailored, as described above, by controlling, in combination, the pore size distribution as a function of architecture thickness and the amount of liquid electrolyte in the architecture. The porous structure includes large gas pores extending throughout the depth of the electron transfer layer 450 and small liquid filled pores in the passive layer 470. Specifically, the electron transfer layer 450 has a pore size distribution defined by both macropores and mesopores and a separator layer 470 having a pore size distribution defined by micropores and/or small mesopores that have a pore size smaller than the smallest pores in the electron transfer layer.

As the architecture is partially dry, the amount of liquid electrolyte is sufficient to fill all the mesopores or all the mesopores as well as the small macropores in the electron transfer layer along with all the micropores and small mesopores in the separator layer, but less than the amount necessary to fill all the pores in the architecture.

Because the architecture is both readily wetted by the electrolyte and partially dry, the pore composition is tailored such that the largest pores in the architecture (i.e., pores having a size greater than $r^{crit}$) are gas filled and the remaining pores (pores smaller than $r^{crit}$) are filled with the liquid electrolyte due to capillary forces. Preferably the gas pores extend from the exterior surface, adjacent the ambient air, into the bulk of the electron transfer layer and the pores at the interface with the anode remain liquid filled throughout the operating life of the cell. In embodiments thereof the critical radius, $r^{crit}$, is above about 500 nm, 1 um, 2 um, 3 um, 4 um, or above about 5 um (i.e., these pores are filled with ambient air in the case of an air cell).

In preferred embodiments the separator layer is monoporous. For example the separator layer has a pore size of about 4 nm, 3 nm, 2 nm, 1 nm, 0.5 nm, or 0.25 nm.

By way of example, in this first specific embodiments, the monoporous separator layer may have a pore size of about 1 nm, and the electron transfer layer contains mesopores and small macropores in the range of 5 nm to 500 nm which are substantially filled with the liquid electrolyte (i.e., liquid pores), and small and large macropores in the range of 500 nm to 1 um which are substantially gas filled (i.e., gas pores), and preferably remain as gaseous pores over the early and middle stages of the discharge, and even more preferably remain gas filled after several cycles (e.g., between 2 and 100 cycles), and even more preferably after several hundred cycles (e.g., 100-1000 cycles).

Second Specific Embodiment

Continuing with reference to FIG. 4, in a second specific embodiment, the instant cell 400 is the same as that which is described above in the first specific embodiment except that in this second embodiment the passive layer has a different type of porous structure; namely a pore size distribution defined by macropores and/or large mesopores which are smaller than the smallest gas-filled macropores in the electron transfer layer. In this specific embodiment, the electron transfer layer has a pore size distribution defined by liquid-filled micropores and/or small mesopores as well as gas-filled macropores. Moreover, in certain embodiments, where high capacity density is paramount, the passive layer has a total pore volume equal to or larger than the total volume of macropores in the electron transfer layer, and may, in certain embodiments, be equal to or larger than the total pore volume in the electron transfer layer. By this expedient the large pores in the passive layer serve as storage pores for accommodating a large volume of discharge product (e.g., solid phase products).

As the architecture is partially dry, the amount of liquid electrolyte added is less than the architecture's total pore volume but is sufficient to entirely fill all the pores in the passive layer (including all the separator layer macropores) as well as the mesopores in the electron transfer layer. However it is insufficient to fill all the pores in the architecture, thus leaving unfilled large gas pores in the electron transfer layer, which are the largest pores in the architecture.

In certain variants of this second specific embodiment, especially where high currents are required, the electron transfer layer may further comprise liquid filled micropores that provide large surface area to sustain high discharge and charge rates.

Continuing with reference to both first and second specific embodiments, cell cycle life and/or delivered discharge capacity may be improved by using an amide based non-aqueous liquid electrolyte containing a solubilizing agent (e.g., one or more anion receptors) as described above, which assists in redistributing discharge product away from the micropores or small mesopores present in the electron transfer layer and into the larger pores in the passive layer.

Third Specific Embodiment

Continuing with reference to FIG. 4, in a third specific embodiment particularly suitable as a high capacity primary cell, the instant cell 400 has: i) a flooded electrolyte configuration; ii) an electron transfer layer 450 having a pore size distribution defined in part or in whole by micropores and/or mesopores; and iii) a separator layer 470 having a pore size distribution defined in whole or in part by macropores that are larger than any pore in the electron transfer layer, and in certain embodiments may be the largest pores in the entire architecture.

The separator layer preferably has a large total pore volume for accommodating significant amounts of solid phase discharge product. In various embodiments, the total pore volume in the separator layer is equal to or larger than the total volume of macropores in the electron transfer layer and may be equal to or larger than the total pore volume in the electron transfer layer.

In alternate embodiments, the electron transfer layer has a pore size distribution defined by micropores and/or small mesopores or a distribution defined by mesopores and/or macropores and the separator layer has a pore size distribution defined by macropores and/or large mesopores larger than the largest pores in the electron transfer layer. For example, a monoporous separator layer having a pore size distribution defined by large macropores having radii of about 10 um and the electron transfer layer having a pore size distribution defined by mesopores and small macropores having radii in the range of 5 nm to 1 um.

Similar to that described above in specific embodiments 1 and 2, to enhance dissolution of reaction product, amide based non-aqueous liquid electrolytes having solubilizing agents such as anion receptors may be used to facilitate redistribution of discharge product into the very large liquid filled macropores in the separator layer.

CONCLUSION

Various embodiments of the invention have been described. However a person of ordinary skill in the art will recognize that various modifications may be made to the described embodiments without departing from the scope of the claims. For example, although described primarily with reference to a lithium-air battery cell, the invention is not so limited and may be applicable to other battery cell systems, especially those that involve the formation of a solid product on discharge, including e.g., lithium-sulfur batteries and more generally lithium-oxygen batteries and other active metal batteries, such as alkali metal air batteries (e.g., Na/Air).

Moreover, although the foregoing invention has been described in some detail with respect to a cathode assembly configured with discrete layers, it is contemplated herein the all or some of the layers may be integrated, such as the active layer and super porous layer part of a unitary structure whereby the layers are identified or distinguished between each other by their functionality or a stepwise or gradual change in their pore size distribution along the thickness of the cathode assembly.

Accordingly, the present embodiments are to be considered as illustrative and not restrictive, and the invention is not to be limited to the details given herein.

What is claimed is:

1. An alkali metal oxygen battery cell comprising:
an alkali metal anode having a major active surface; and
a porous cathode architecture adjacent the anode major active surface, the architecture comprising first and second porous regions each having a different entirely wettable porous structure and further comprising a certain volume of liquid electrolyte; wherein the first porous region provides active surface sites for electron transfer, access for molecular oxygen to enter the cathode architecture, and is characterized as having a first region total pore volume;
the second porous region, not an electron transfer region, is: i) in pore communication with the first porous region; ii) disposed adjacent to the anode major surface; and iii) characterized as having a second region total pore volume; and
the certain volume of liquid electrolyte is greater than the total pore volume of the second region but less than the cumulative total pore volumes of the first and second regions, and said certain volume of liquid electrolyte is the amount present in the architecture immediately prior to and upon initial cell operation.

2. The alkali metal oxygen battery cell of claim 1 wherein the second porous region is in direct contact with the anode major surface.

3. The alkali metal oxygen battery cell of claim 1 wherein the cell further comprises an external case or enclosure having at least one sidewall permeable to air or molecular oxygen-containing gas for harnessing molecular oxygen which is ultimately electro-reduced on the surface of the electron transfer medium during cell discharge.

4. The alkali metal oxygen battery cell of claim 3 wherein the first porous region is positioned in the cell nearby the molecular oxygen-permeable sidewall, and is in contiguous gas phase communication with the ambient air or molecular oxygen-containing gas.

5. The metal oxygen battery cell of claim 1 wherein the first and second porous regions are discrete porous body layers.

6. The metal oxygen battery cell of claim 1 wherein the porous structures of the first and second regions differ in at least one of pore composition, pore size distribution, and solid material from which the porous region is composed.

7. The metal oxygen battery cell of claim 6 wherein the difference in porous structure is at least based on a difference in pore size distribution.

8. The metal oxygen battery cell of claim 7 wherein the difference in pore size distribution is tailored to cause, via capillary forces, the liquid electrolyte to fill all the pores in the second porous region and only a portion of the pores in the first porous region, the liquid electrolyte substantially completely filling the second region total pore volume and only partially filling the first region total pore volume, with the remaining first region pore volume filled with air or molecular oxygen-containing gas.

9. The metal oxygen battery cell of claim 7 wherein the second region pore size distribution is defined by micropores, mesopores or a combination thereof, and the first region pore size distribution is defined by a combination of macropores and mesopores.

10. The metal oxygen battery cell of claim 9 wherein the mesopores in the second region are smaller than the mesopores in the first region.

11. The metal oxygen battery cell of claim 10 wherein substantially all the pores in the second region have pore radii smaller than the pore radii of the smallest pores in the first region.

12. The metal oxygen battery cell of claim 7 wherein the amount of liquid electrolyte in the architecture is greater than the cumulative pore volume of all the mesopores in the first region and all the micropores and mesopores in the second region, but is insufficient to fill the entire architecture such that the largest pores in the first region are gas filled.

13. The metal oxygen battery cell of claim 7 wherein the second region pore size distribution is defined by micropores, mesopores or a combination thereof, and the first region pore size distribution is defined solely by macropores.

14. The alkali metal oxygen battery cell of claim 7 wherein the first region comprises pores of relatively large and small pore radii and the majority of the second region pore volume is defined by pores of relatively intermediate size, the radii of the intermediate sized pores falling between those of the large and small pores in the first region.

15. The alkali metal oxygen battery cell of claim 14 wherein said intermediate pores of the second region and said small pores of the first region are substantially completely filled with said liquid electrolyte and only a portion, if any, of the large pores of the first region are filled with the liquid electrolyte, and the remaining large pores are gas filled and thereby provide fast oxygen diffusion channels into the depth of the architecture.

16. The alkali metal oxygen battery cell of claim 7 wherein the pore size distribution of the first porous region is multimodal, having at least a primary and a secondary modalities, and the pore size distribution of the second region is unimodal.

17. A method of making a metal oxygen battery cell, the method comprising:
  i) providing an alkali metal anode having a major active surface;
  ii) providing a porous cathode architecture having first and second porous regions each having a different entirely wettable porous structure:
    the first porous region providing active surface sites for electron transfer, access for molecular oxygen to enter the cathode architecture, and characterized as having a first region total pore volume;
    the second porous region, not an electron transfer region: i) in pore communication with the first porous region; ii) disposed adjacent to the anode major surface; and iii) characterized as having a second region total pore volume;
  iii) configuring the anode major active surface adjacent the cathode architecture;
  iv) filling the cathode architecture with a volume of liquid electrolyte that is greater than the second region total pore volume but less than the combined total pore volume of the first and second regions; and
    further wherein said volume of liquid electrolyte is the amount present in the architecture immediately prior to and upon initial cell operation.

18. The method of claim 17 wherein the first and second regions are defined by discrete solid porous body layers, a first solid porous body layer serving as the electron transfer region and a second solid porous body layer serving as a passive region.

* * * * *